United States Patent [19]

Hatakeyama et al.

[11] Patent Number: 5,220,625
[45] Date of Patent: Jun. 15, 1993

[54] INFORMATION SEARCH TERMINAL AND SYSTEM

[75] Inventors: Atsushi Hatakeyama, Kokubunji; Hiroe Ando, Yokohama; Kanji Kato, Tokorozawa; Satoshi Asakawa, Hirakata; Hisamitsu Kawaguchi, Sagamihara, all of Japan

[73] Assignee: Hitachi, Ltd., Tokyo, Japan

[21] Appl. No.: 914,334

[22] Filed: Jul. 17, 1992

Related U.S. Application Data

[63] Continuation-in-part of Ser. No. 555,483, filed as PCT/JP90/00774, on Jun. 14, 1990, Pat. No. 5,168,533.

[30] Foreign Application Priority Data

| Jun. 14, 1989 | [JP] | Japan | 1-149630 |
| Jul. 24, 1989 | [JP] | Japan | 1-188772 |
| Jul. 24, 1989 | [JP] | Japan | 1-188773 |
| Sep. 8, 1989 | [JP] | Japan | 1-231567 |
| Jul. 19, 1991 | [JP] | Japan | 3-203469 |

[51] Int. Cl.⁵ .............................................. G10L 3/02
[52] U.S. Cl. ........................................ 382/54; 382/10
[58] Field of Search ............................ 382/54, 10-14, 382/16; 364/DIG. 1, 200

[56] References Cited

U.S. PATENT DOCUMENTS

| 4,320,451 | 3/1982 | Bachman et al. | 364/200 |
| 4,395,757 | 7/1983 | Bienvenu et al. | 364/200 |
| 4,418,385 | 11/1983 | Bourrez | 364/200 |
| 4,430,699 | 2/1984 | Segarra et al. | 364/200 |
| 4,539,655 | 9/1985 | Trussell et al. | 364/900 |
| 4,589,065 | 5/1986 | Auslander et al. | 364/200 |
| 4,635,189 | 1/1987 | Kendall | 364/200 |
| 4,870,704 | 9/1989 | Matelan et al. | 364/200 |

FOREIGN PATENT DOCUMENTS

| 60-105039 | 6/1985 | Japan . |
| 60-105040 | 6/1985 | Japan . |
| 60-117326 | 6/1985 | Japan . |
| 62-105270 | 10/1985 | Japan . |
| 62-11932 | 1/1987 | Japan . |
| 6435662 | 7/1987 | Japan . |
| 62-241026 | 10/1987 | Japan . |
| 63-311530 | 12/1988 | Japan . |

OTHER PUBLICATIONS

Journal of the American Society for Information Science vol. 37 No. 3 May 1986, pp. 123-135. U. Mukhopadyay et al. "An intelligent system for document retrieval in distributed office environments".

Robert L. Haskin, et al. "Operational Characteristics of a Hardware-Based Pattern Matcher", ACM Transactions On Database Systems, vol. 8, No. 1, Mar. 1983, pp. 15-40.

Primary Examiner—Stephen Brinich
Attorney, Agent, or Firm—Antonelli, Terry, Stout & Kraus

[57] ABSTRACT

An information search terminal apparatus and information search system for performing information search by using a variety of windows assure high manipulatability for the user by making available information of the results of searches performed in the past and the current system state. The information search terminal and system includes a query statement input window for inputting a search query statement for a search term, a search history display window for displaying the search query statement and the number of documents as hit in the search, a search result list display window for displaying in juxtaposition a plurality of titles of documents as hit in the form of a list, and a document display window for displaying a document containing the search term and resulting from the search 25 Claims, 29 Drawing Sheets

FIG. 3
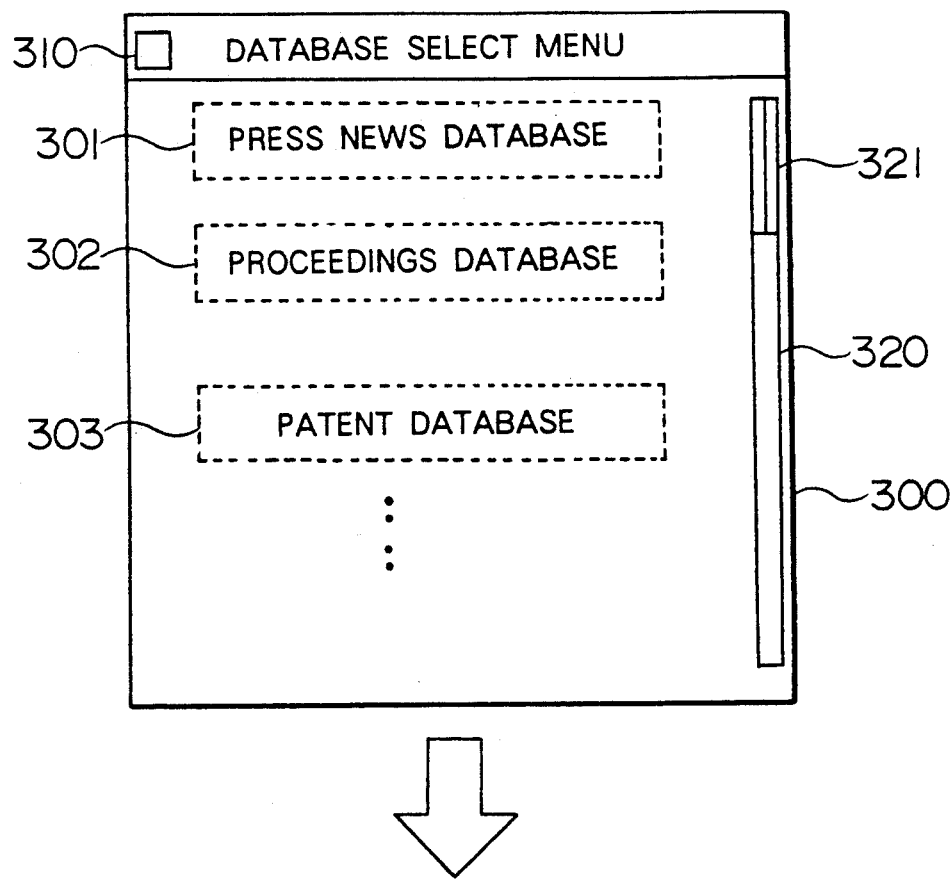
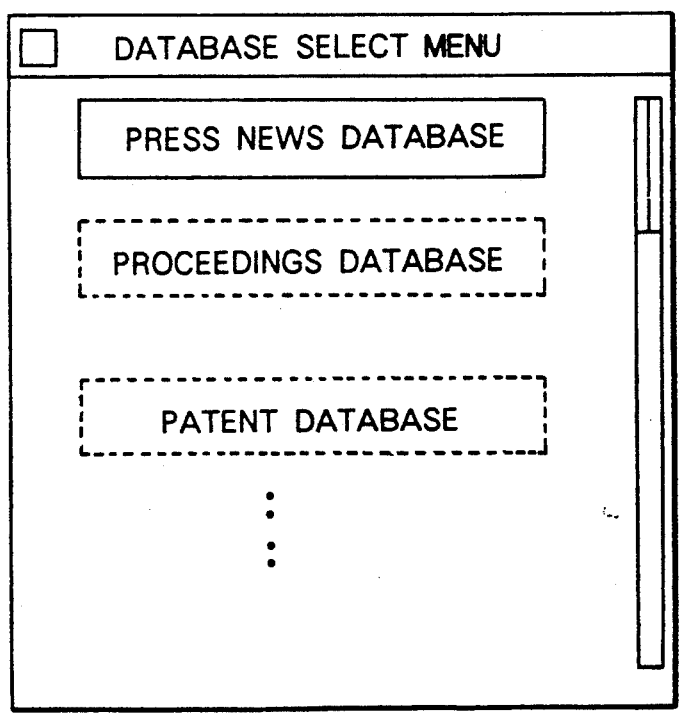

FIG. 23

DOCUMENT DISPLAY : RESULT SET NO.2　INTRA-SET SERIAL NO.1　　NEXT DOCUMENT　PRECEDING DOCUMENT

STRING COPY

SEARCH TERM HIGHLIGHT

例えば、「計算機」という文字列を検索した結果を母集合として、ユニバース検索した場合には、以後の検索結果は「計算機」との論理積の集合となる。すなわち、「高性能ワークステーション」という文字列は、「計算機 AND 高性能ワークステーション」という条件で検索したのと同一の意味を持つ。ユニバース検索の母集合として特に母集合を指定しない場合には、データベース内の文書全体を対象とした通常の検索を行う。

ハイアラーキ検索とは、直前の検索結果を順次母集合として置き換えていく検索モードを示す。
例えば、最初「計算機」で検索すれば、二度目の検索は「高性能ワークステーション」の指定で「計算機 AND 高性能ワークステーション」で検索するのと同一の結果をもたらし、三番目の検索では、「スーパーコンピュータ」の指定で、「計算機 AND 高性能ワークステーション AND スーパーコンピュータ」で検索するのと同一の結果となる。

2100

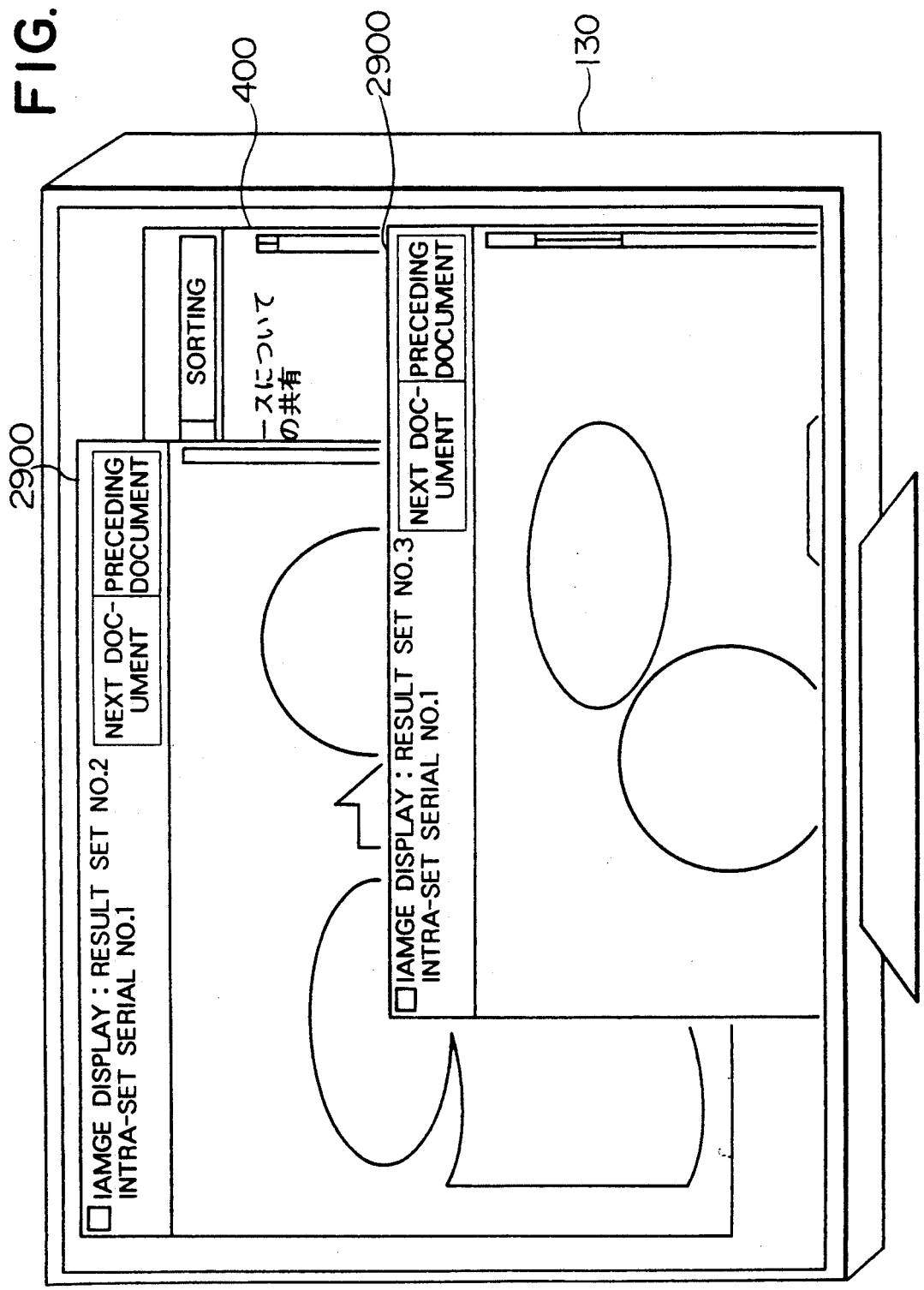

INFORMATION SEARCH TERMINAL AND SYSTEM

CROSS-REFERENCE TO THE RELATED APPLICATION

This application is a continuation-in-part of our U.S. application Ser. No. 555,483; filed PCT JP 90/00774 on Jun. 14, 1990 ;now U.S. Pat. No. 5,168,533, issued Dec. 1, 1992 the disclosure of which is hereby incorporated by reference.

BACKGROUND OF THE INVENTION

The present invention relates to an information search terminal apparatus (also referred to simply as terminal) in an information search/retrieval system for searching from a database storing document data and the like a desired document as a whole by using a designated character string as a search term. More particularly, the invention is concerned with information search terminal and system which can afford improved manipulatability to the user.

In the document search or retrieval systems known heretofore, search can be performed only through a continuous flow of processings, starting from the inputting of search conditions or queries till the display of a document resulting from the search, as is disclosed in JP-A-62-105270. In other words, the document search had to be performed through a series of sequential processings of inputting the search queries, display of search results in the from of a list and then display of the document data. More specifically, by selecting a document (ID) number from the list of the search results, contents of the corresponding document can be displayed. However, in order to designate another document the content of which is to be displayed, manipulation for displaying once again the list of search results is required. This means that the flow of processings performed by the user will necessarily be interrupted and the search process has to be executed once again from the beginning, providing thus a cause for degradation in efficiency of the document search operation.

There is proposed in JP-A-64-35662 a document search system which is capable of displaying simultaneously a plurality of samples of documents as searched, as an approach for improving the efficiency of the document search. This system is however disadvantageous in that once one document has been selected from a plurality of sample images, all the processes carried out till than are canceled, as a result of which the sample image list can no more be restored even when it becomes necessary to select again another document. It goes without saying that such processing which cancels the processes executed in the past will remarkably degrade the efficiency of document search operation.

Further, in the document search system disclosed in JP-A-62-11932, there is proposed a technique for expanding from a search term designated by the user other character strings or terms having a same meaning as the designated search term before searching a database. However, in this known search system, no information is available for the user to know which of the terms inclusive of the expanded one is used as the search term in the search processing performed currently, to discomfortableness of the operator. Accordingly, the search should be performed after having confirmed the results of expansion of the search term as specified or designated. However, necessity of confirming the expansions of the search term upon every search will impose troublesome procedure or burden to the user, presenting thus another problem.

Additionally, it is noted that in the course of the search, there often arises a need for screening a set of documents resulting from a preceding search in the light of additional or new queries or conditions. By way of example, let's assume that one million documents registered in a document database can be reduced to ten thousand documents through a screening search process and that the ten thousand documents be reduced to about one hundred documents through a second screening process. In carrying out such screening, there are conceivable two modes, i.e., a mode in which the search is performed on the basis of a set of results obtained from an immediately preceding search and a mode in which the search is performed on the basis of a specific document set by applying various query conditions in a trail-and-error manner. For convenience of description, the first mentioned search mode will be referred to as "hierarchy search" with the second mode being termed "universe mode". In order to realize the screening search mentioned above, there is required means for informing the user whether the search performed currently is for all the documents stored in the database or a screening search is performed on a base set (generatrix set) including the result of the preceding search or in which mode of hierarchy or universe search and search is currently performed.

SUMMARY OF THE INVENTION

It is therefore an object of the present invention to provide information search terminal apparatus and system for searching information such as document data, which can afford a highly improved manipulatability to the user by saving history of searches performed in the past and making available to the user information concerning the current system state such as results of development of a specified search term, a set of results of the searches performed in the past and subjected to the current search, and the mode in which the search is currently performed.

In view of the above and other objects which will become apparent as description procedes, there is provided according to an aspect of the invention an information search system as well as information search terminal which includes facilities for generating independent of one another.

(1) a search query input window for allowing the user to input statements of conditions (queries) to be imposed on a search term (character string), (2) a search history display window for displaying the search query or condition statements and the number of documents found hit as the result of the search, (3) a search result list display window for displaying s plurality of document names (or title) as hit in parallel in a list, and (4) a document display window for displaying a document or documents resulting from the search and containing the search term, wherein the independent windows mentioned above are displayed on a display unit sequentially one by one or simultaneously in a controllable manner.

For operating or manipulating the information search apparatus according to the invention, the user first confirms search processes performed in the past by displaying them in the search history window. Thereafter, the query or condition statement concerning the search term is inputted by using the search query input window. In this conjunction, it should be mentioned that the search query input window can be implemented by employing a user-friendly input user interface for establishing various search queries or conditions so that appropriate guidance is furnished to the user even when he or she is not familiar with the method of inputting the search queries or conditions. In the search result list display window, there are displayed titles or names of documents, authors, dates of creation and the like items in the form of a list. On the basis of this list, the user can confirm the desired information by himself or herself and select the desired document. In the document display window, all the texts of the document resulting from the search is displayed. In this way, the user can perform the search and retrieval of desired information through a series of processings flowing smoothly. Each of the windows mentioned above can be closed only when the user demands it. Besides, a plurality of windows can simultaneously be displayed.

According to another aspect of the present invention, it is further proposed to provide (5) an expanded development term display window for presenting previously synonym terms having similar or same meaning as the input search term and an expand option designating window for allowing the user to select the expanded terms.

By virtue of these windows, synonyms and spelling variants can automatically be expanded from the input search term to be subsequently used in the search.

According to yet another aspect of the invention, it is proposed to generate (6) a search mode change-over menu within the search history display window for changing over the universe search mode and the hierarchy search mode to each other.

Owing to this feature, it is possible to effectuate the screening search by designating a base set (i.e., a generatrix set) of the search results. Besides, search can be performed on one and the same base or generatrix set by imposing various queries or search conditions.

At this juncture, it must however by mentioned that provision of all the windows mentioned above is not necessarily required for carrying out the invention. The search history display window (2) as well as the expanded term display window and the expand option designating windows (5) represent by itself or by themselves novel feature of the present invention which can not be found in the prior art search techniques.

According to a further aspect of the invention, there are proposed means for controlling the displays in the individual windows mentioned above.

The above and other objects, features and advantages of the present invention will become more apparent upon reading the following description of the preferred embodiments illustrated, by way of example only, in the accompanying drawings.

BRIEF DESCRIPTION OF THE DRAWINGS

FIG. 3 is a view showing a display configuration of a database selection menu;

FIG. 23 is a view showing a state of the document display window in which a search term is displayed in highlight;

FIG. 29 is a view showing a display state of an information search terminal in which image display windows showing graphics corresponding to text data and image data are generated.

DESCRIPTION OF THE PREFERRED EMBODIMENTS

In the following, the present invention will be described in detail in conjunction with preferred or exemplary embodiments thereof by reference to the drawings.

Figure 1A:
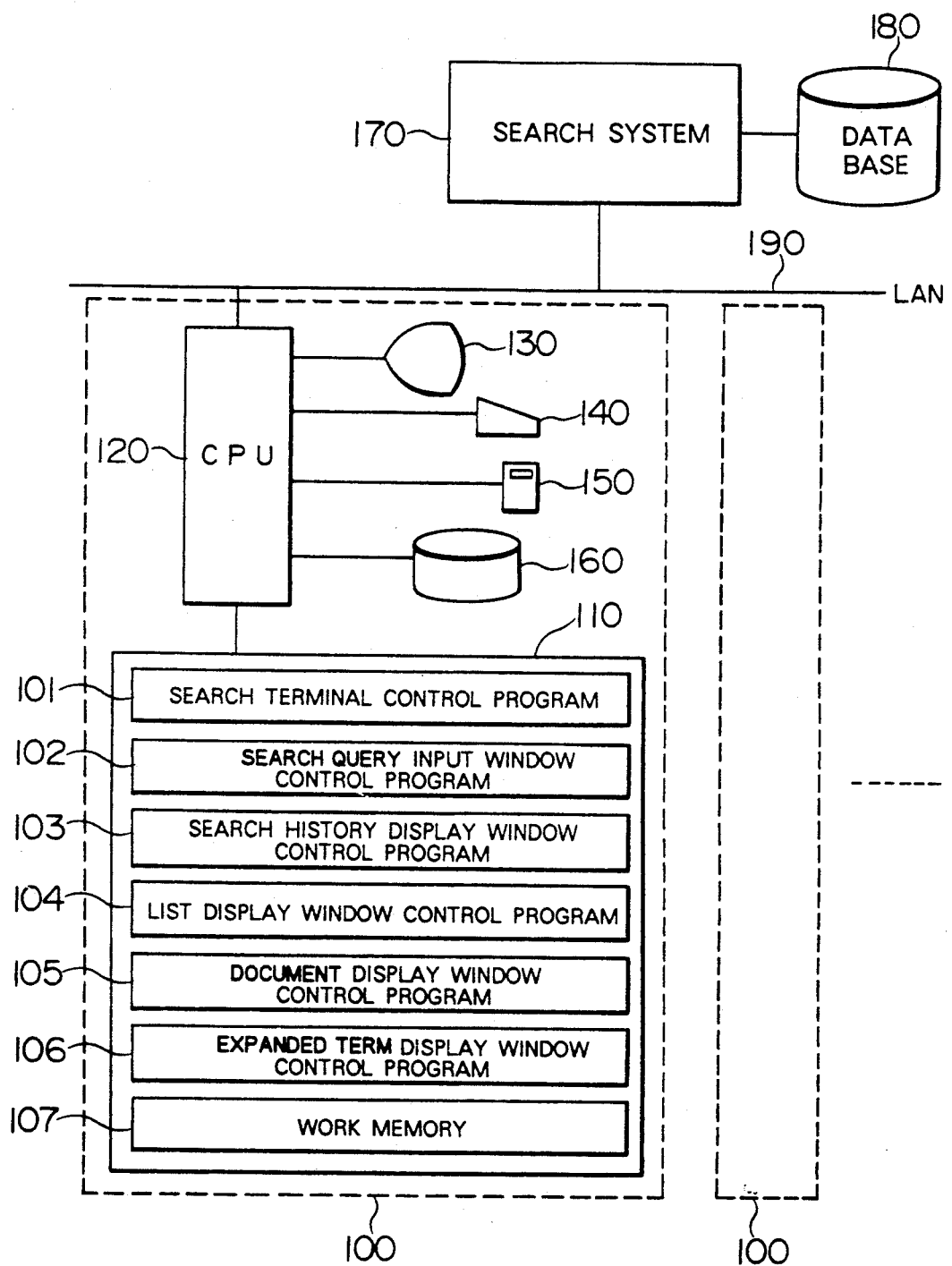
FIG. 1A is a schematic block diagram showing a general arrangement of an information search system according to an embodiment of the invention.

FIG. 1A is a schematic block diagram showing a general arrangement of an information search or retrieval system according to an embodiment of the invention. This system is constituted by a search terminal apparatus 100, a search/retrieval system 170, a database 180 and a LAN (Local Area Network) 190 for interconnecting the above-mentioned componebts 100, 170 and 180 in the form of a client/server system. The search terminal 100 located on the client side includes a memory 100 for storing programs which includes a work memory, a CPU (Central Processing Unit) 120 for executing a variety of programs, a display unit 130, a keyboard 140, a mouse 150, and a magnetic disk equipment 160. Needless to say, the client search terminal 100 may be equipped with an output device such as a printer. As the programs stored in the memory 110, there can be mentioned a search terminal control program 101, a search query input window control program 102, a search history display window control program 103, a list display window control program 104, a document display window control program 105 and an expanded term display window control program 106. The work memory or area reserved on the memory 110 is denoted by a reference numeral 107.

Parenthetically, the search/retrieval system 170 serving as a server system is destined for performing various searches and retrievals including development or generation of synonyms and spelling variants of serch terms, compound-condition search (i.e., search with various serach conditions) and others by using the database 180 and resorting to the aid of facilities disclosed in WO 90/16036 (PCT JP 90/00774) filed Jun. 14, 1990 in the name of the same assignee as the present application.

Figure 1B:
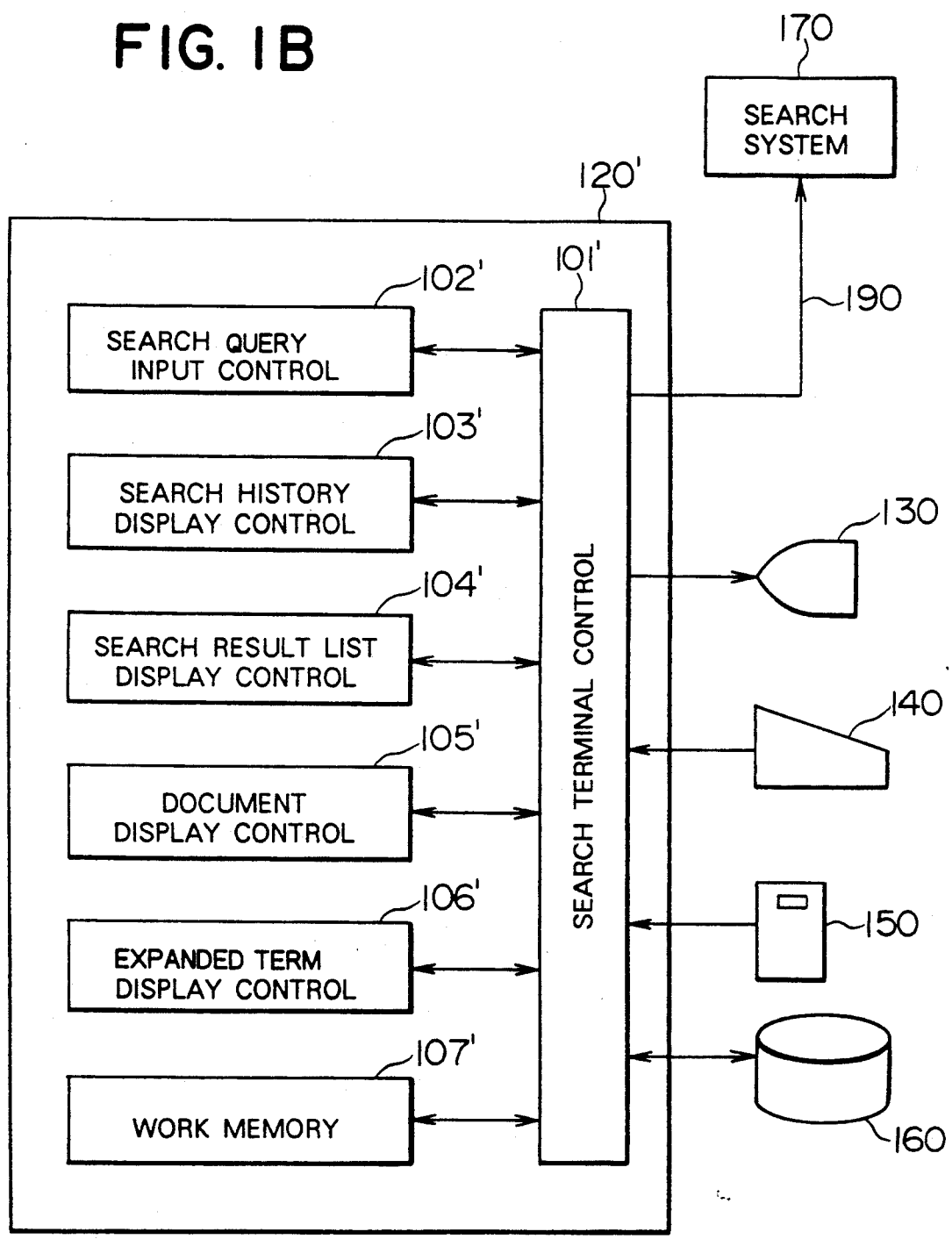
FIG. 1B is a schematic block diagram showing a general arrangement of an information search terminal equipped with a search terminal controller.

FIG. 1B is a schematic block diagram showing a general arrangement of an information search terminal 100 which incorporated a terminal controller 120' serving for for coupling organically the CPU 120 and the memory 110 shown in FIG. 1A. Referring to FIG. 1B, operations of the system according to the instant embodiment of the invention will first be described in general.

The search terminal control facility 101' serves as interface for allowing and controlling transactions between a search query input control module 102', a search history display control module 103', a search result list display control module 104', a document display control module 105', an expanded term display control program 106' and a work memory 107+ on one hand and input/output units such as a display unit 130, a keyboard 140, a mouse 150, the magnetic disk equipment 160 and the server search system 170 on the other hand.

The search query input control module 102' is provided for the purpose of inputting a search query statement, i.e. a character string (also referred to as search term) in the light of which the search is to be performed. A window which makes appearance on the display unit 130 upon activation of the search query input control facility 102' is referred to as "search query input window". Upon inputting of the search term (character string) in the search query input window, the search term is then transferred to the server search system 170. Thereafter, the search query input control module 102' receives from the server system 170 the information concerning how many documents have been hit in the course of search performed on the document data stored in the database 180 by using the search term, i.e., the information about the number of search results.

The search history display control module 103' is provided for displaying sequentially the inputted search queries and the search result number on a search-by-search basis. The window used for this purpose is referred to as "search history display window". This search history display window is adapted to show the results (history) of a number of the searches as performed in the form of a table.

When one of the plural search results displayed in the search history display window is selected by means of a result designating means (not shown) incorporated in the search history display control module 103', there is displayed a list of bibliographic items such as document name or title, data of creation of the document, author's name and the like contained in the search result as selected. The window generated for displaying this list is referred to as "list display window".

In order to display the data body of the document (i.e. text data), the document display control module 105' mentioned above is activated after the selection of the search result mentioned above. The window generated to this end is referred to as "document display window".

The aforementioned windows are held in the saved state so long as no request for abandonment is inputted by the user. For example, unless the contents of the search history window are abandoned or deleted, the result of any one of the plural searches performed in the past can be visualized any number of times as desired by opening the list display window. Assuming, by way of example, that the result of search of documents containing a character string or search term

"ス-パ-コンピュ-タ

(Japanese kana string meaning a supercomputer in English)" and the result of search of documents containing a character string

"高性能ワ-クステ-ション

(high-performance work station)" are displayed as the search history information in the search history window, the contents of these search results can be displayed at any time as desired. Besides, it is possible to display simultaneously these two results of the searches for the purpose of comparison.

The same holds true for the document display window. Accordingly, by comparing two documents as displayed, it is possible to create or assemble a search query statement to be next inputted, if desired. Thus, there can be realized comparative reviews not only for a plurality of displayed documents selected from a same list display window but also for a plurality of documents which are selected, respectively, from a plurality of list display windows which in turn are selected from a same search history window.

Further, there can also be displayed in the search query input window an expanded search term display menu showing other character strings or serch terms having a same meaning as the inputted or designated search term by making use of an expanded term display activation facility (not shown) incorporated in the expanded term display control module 106'. In that case, by selecting the expanded term display menu by using the mouse 150', the expanded term display control means 106' is activated to open the expanded term display window for allowing the results of expansion of the inputted search term to be displayed. Thus, by selecting the search term or character string as desired from the expanded terms by designating by using the mouse 150, for example, the search can be executed on the basis of the selected search term owing to an expanded term selecting facility (not shown) incorporated in the expanded term display control module 106'. In this manner, the expended term can be displayed only when the user demands it, i.e., only when the expanded term display menu is selected, whereby the user can get rid of troublesome processing procedures invloved in expanding the search terms, to an advantageous effect.

Additionally, it is possible to display within the search query input window a list of conditions for the searches which can be performed by the server search system 170 in the form of a menu. Once the user has selected a search query to be inputted, the window display configuration is so modified as to be optimal for displaying the selected query. In this manner, information is always made available for the user as to what functions the server search system 170 has. Moreover, even when the user has no knowledge concerning the procedure for inputting the search queries which differ from one to another function of the server search system, guidance is presented to the user by the search terminal controller 120', to a further advantage.

In the document display window, a desired character string may be cut out from a document being displayed in this window by activating a character string designating facility incorporated in the document display control module 105' to thereby select the cut-out character string as a new search term. More specifically, a desired character string in the document being displayed in the document display window is swept by a mouse cursor by manipulating correspondingly the mouse 150 to thereby designate the character string as the new search term, which is then copied to the search query input window.

The search history display control module 103' includes a search mode change-over facility (not shown) for changing over a universe search mode and a hierarchy search mode in the search history display window. In the universe search mode, a result set designating facility implemented in the search history display control module 103' performs a screening search on a set of the search results designated by a search result set designating module. In this conjunction, the set of documents to be subjected to the screening search is referred to as the base set.

Assuming, by way of example, that the universe search is performed on the base set of the documents resulting from the search carried out by using the character string " 計算機 (computer)" as the search term, the result of any subsequent universe search represents a logical product with the set of results obtained from the search performed precedingly with the search term " 計算機 (computer)". For example, when the search is performed in the universe mode by using a search term

" 高性能 ワークステーション

(high-performance work station)" on the base set mentioned above, the result obtained from this search is same as the result of a search performed on the search condition of " 計算機 AND 高性能 ワークステーション

(computer AND high-performance work station), while the search in the universe mode performed with a search term

" スーパーコンピュータ

(supercomputer)" will lead to the same result as a search which is performed by using a search term " 計算機 AND スーパーコンピュータ

(computer AND supercomputer)". In this conjunction, it is however to be noted that unless any particular base set is designated in the universe mode, the ordinary search is performed on all the documents stored in the database.

On the other hand, with the hierarchy search, it is intended to mean such a search mode in which the results of any immediately preceding searches constitute base sets in a sequential manner. More specifically, assuming that a first search is performed with the search term " 計算機 (computer), a second search performed with the search term designated as

" 高性能 ワークステーション

(high-performance work station)" will bring about same result as that search which is performed with a search term " 計算機 AND 高性能

ワークステーション

(computer AND high-performance work station", while a third search performed by designating as the search term

" スーパコンピュータ

(supercomputer)" will bring about a same result as a search performed with the search term " 計算機 AND 高性能 ワークステーション

AND スーパコンピュー タ(computer AND high-performance work station AND supercomputer)".

By displaying the search mode change-over menu together with the mode within the search history display window in the manner described above so that the user can confirm at any time the search mode being currently enabled, there can be provided a search terminal apparatus which can ensure improved manipulatability while avoiding erroneous setting of the search queries by the user.

Now, description will turn to improvement of the manipulatability owing to the list display of the search result in in the search history window. The data for the list display are stored in the server search system 170. Accordingly, it is necessary to read out from the search system 170 the bibliographic item data corresponding to the number of the search results and display them in the list display window. In that case, the user is forced to stand by for a time during which the data are read out from the search system 170 only for the purpose of confirming tentatively the documents as searched. For reducing this stand-by time, the magnetic disk equipment 160 is utilized as a temporary storage control facility for reading and storing temporarily data for the list display corresponding to one page of the window from the search system 170 in precedence to the designation of the list display. In this way, the user can effective make use of the time involved in decision as to generation of the list display on the basis of the number of the search results, whereby the time taken from the issuance of command for the list display to the actual data display can be reduced.

In this manner, by providing the windows separately for the display processings, respectively, and saving any window until it is designated by the user, there is provided a search terminal which can enjoy an improved manipulatability while ensuring continuity or consistency in the thinking process of the user.

Further, because the result of expansion of the search term as well as the search mode is displayed only when it is requested, the information concerning the system state is made available for the user at any time.

Additionally, since the data used in the list display window for displaying a list of documents resulting from the search can be acquired before designation of the list display, high response performance of the system can be realized.

The information search terminal which uses the terminal controller 120' as described above can be so implemented as to operate by using the programs stored in the memory 110 shown in FIG. 1A. Further, it goes without saying that each of the control modules can be constituted by combinations of various logic hardware circuits.

In the following, each of the processing programs shown in FIG. 1A will be described in detail in association with the flow of the search processings according to the invention by enumerating examples of data and information generated on the display unit 130.

Upon activation of the search terminal apparatus, the search terminal control program 101 first activates the search history display window control program 103.

In the processings involved in the execution of the search history display window control program 103, a database select window (300 in FIG. 3) is first opened for selecting a database which is to undergo the search. To this end, a database open request for a database selected by the user is issued to the server search system 170.

Subsequently, the search history display window (denoted by 400 in FIG. 4) is opened, which is then followed by the state waiting for the input of request by the user. In accordance with the request inputted by the user, the window control program for the search query inputting, list display or the document display is activated. (Concerning details of the search query input window generation ②, the list display ③ and the document display ④ shown in FIG. 2, description will be made later on.)

Upon issuance of the search mode change over request, a new search mode is sent to the search system 170 with the mode display being changed over.

When a request for interruption of the search is issued, a request for interrupting the search processing which is currently in progress is sent to the search system. Upon input of a search history abandon request, a database close request is sent to the search system 170 to close the search history display window 400.

Figure 2:
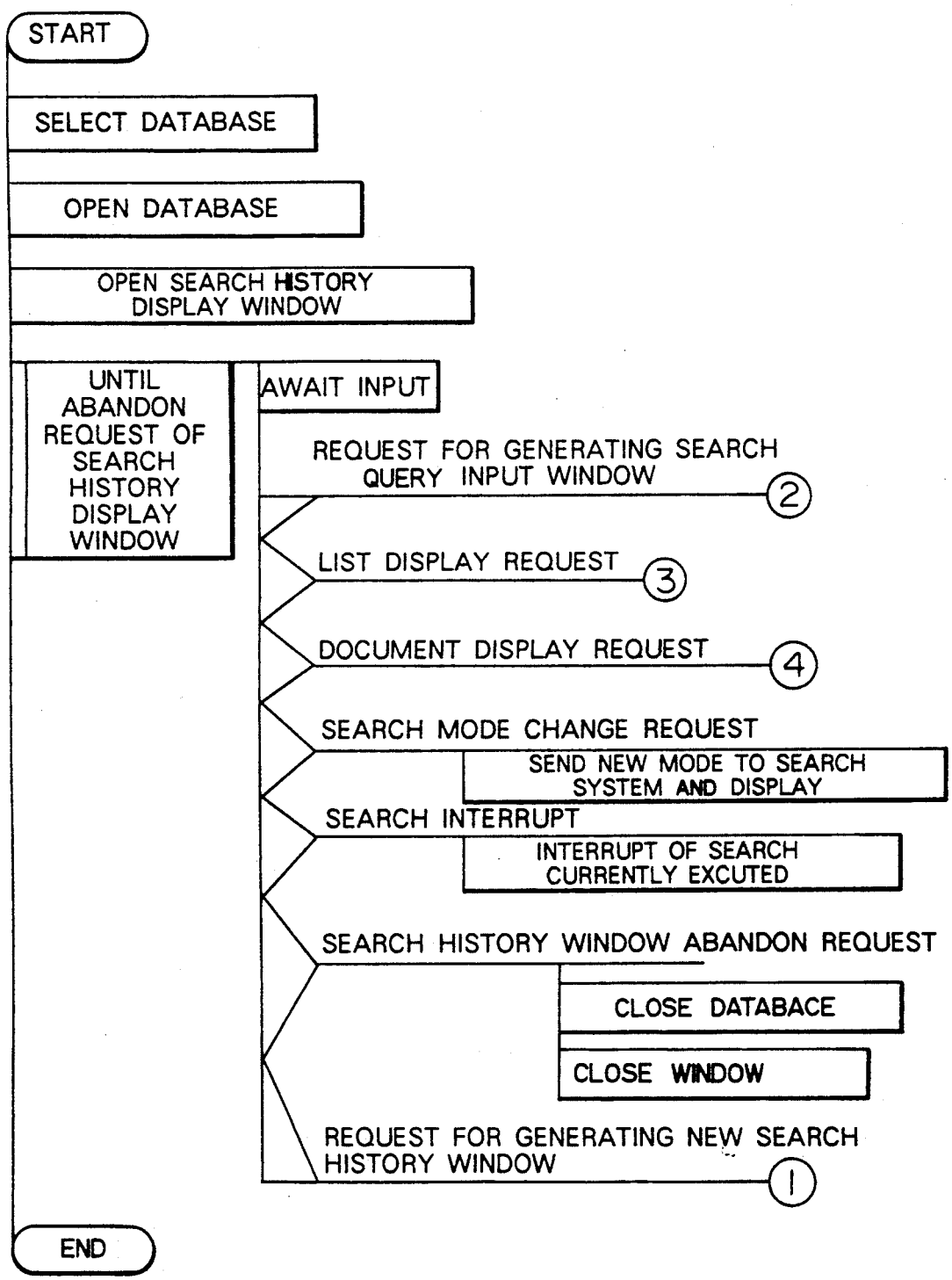
FIG. 2 is a PAD diagram for illustrating processing performed by a search history display window control facility.

Upon issuance of a new search history window generation request, the search history display window control program 103 is activated once again for selecting and opening another database, whereby another search history display window 400 is newly opened (as is indicated at ① in FIG. 2).

With the term "window" used herein, a display area for displaying predetermined data on the screen of the display unit is meant. Such display area or window may be provided with a display field for displaying items to be selectively inputted so that the items can be selected by manipulating the mouse.

In the menu which makes appearance within the database select window 300, database names are enumerated. By selecting one of the areas 301, 302 and 303 in which the database names are entered, by using the mouse, the database item as selected is displayed in reversal, indicating the selection thereof, as is illustrated in FIG. 3.

Referring to FIG. 3, a small square area 310 represents a cancel mark. When this small square area 310 is selected by the mouse cursor, the window display is closed or abandoned. This small square area 310 will hereinafter be referred to as the window abandon button. In the case of the database selection now under consideration, the selection of the window abandon button 310 by the mouse cursor indicates closing of the search history display window control program 103, whereby all the succeeding processings are inhibited from execution. In FIG. 3, reference numerals 320 and 321 denote scroll bars which make appearance when there exist many database items, indicating that the data items being displayed within the window are only parts of all the database items. By positioning the mouse cursor on the scroll bar 321 and moving it in the vertical direction, the items which succeed to those displayed in the windows are caused to make appearance in the window.

Figure 4:
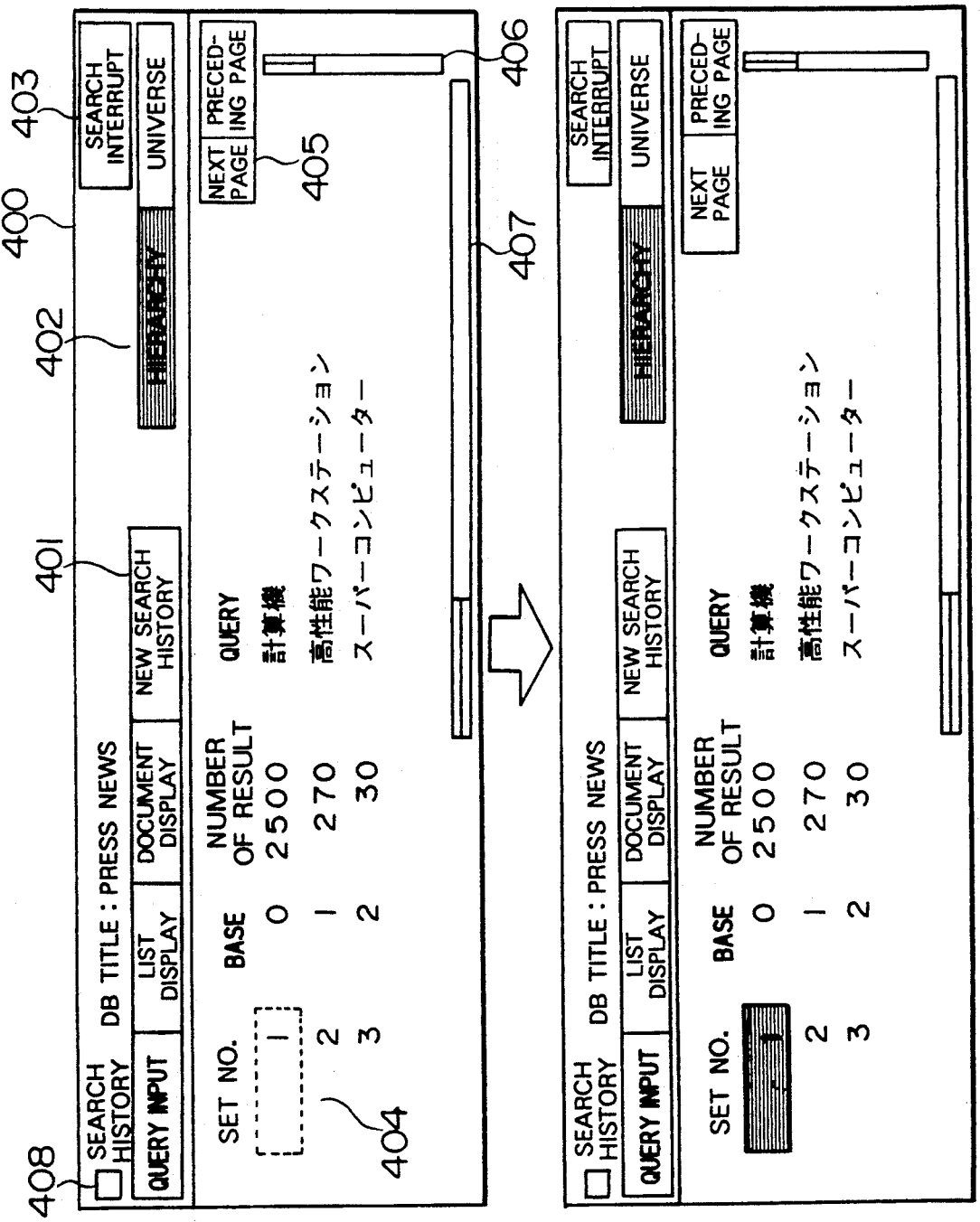
FIG. 4 is a view showing a display configuration of a search history display window.

After selection of the database, the search history display window 400 shown in FIG. 4 is opened. When a search query in the select menu 401 is selected by using the mouse, the search query input window control program 102 is activated to open the search query input window, whereby setting of interfaces for various conditions, designation of expand options, display of expanded terms and execution of the search can be performed.

On the other hand, when the select menu 402 is selected through the mouse manipulation in the search history display window 400, the search mode is changed over. In the select menu 402, either the hierarchy or universe mode is constantly displayed in reversal, indicating the search mode validated currently. Designation of the set number is realized by selecting or clicking the display area 404 for the set numbers. More specifically, selection of the set number is indicated by the reversal display thereof. By clicking once again the reversal display with the mouse cursor, the original display is restored.

The base sets in the hierarchy and universe searches are shown in in the column labeled "base". The base "0" indicates a set including all the data bases. For designating the search result set 2 as the new base in the hierarchy search, the set number "2" is selected by using the mouse, being then followed by selection of the hierarchy mode in the select menu. Then, the set number "2 is newly displayed in the column of the base, indicating that the succeeding search is performed on the base identified by the set number "2".

In case the history information is too lengthy to be displayed in the window, the succeeding or preceding page menu 405 is selected to thereby start a new page. This can be achieved by using the scroll bar 406. Furthermore, in the case of the search query statement of a greater length, the search query being displayed may be scrolled in the horizontal direction by using a scroll bar 407.

Figure 22:
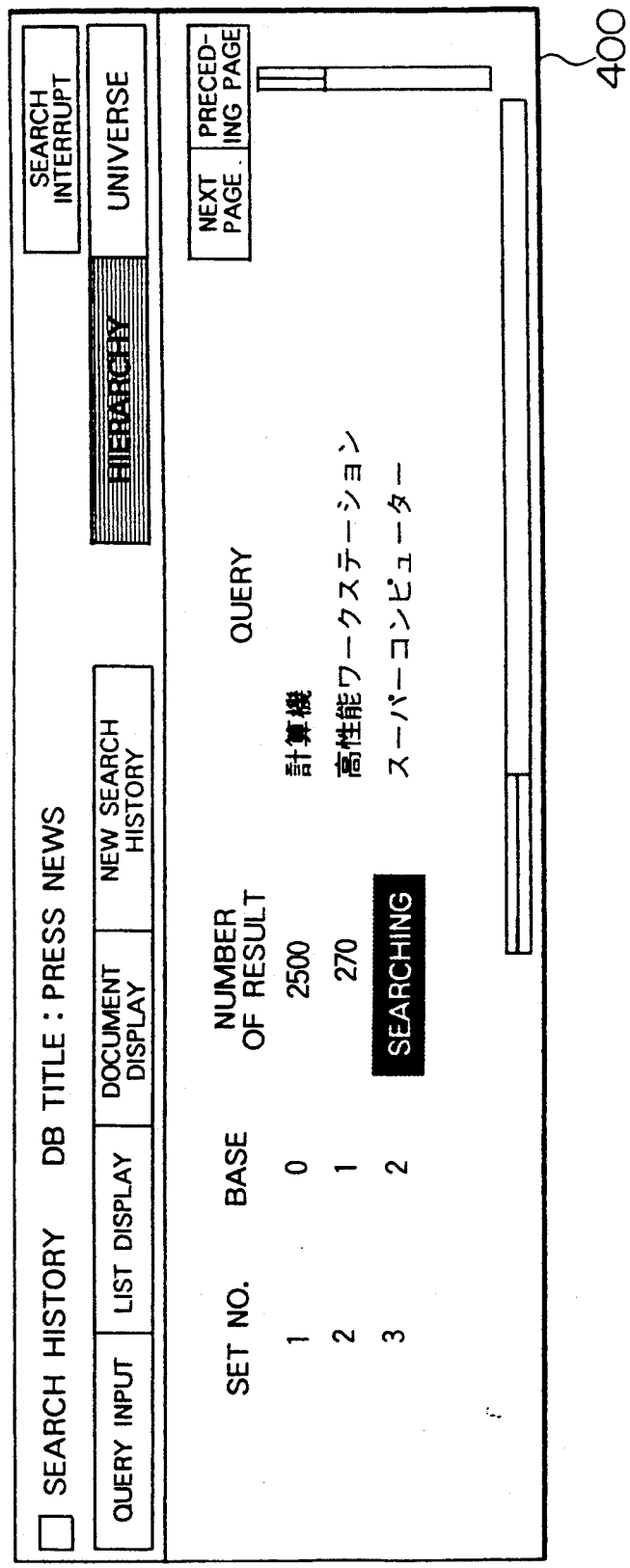
FIG. 22 is a view showing a state of the search history display window in the course of execution of search processing.
Figure 24:
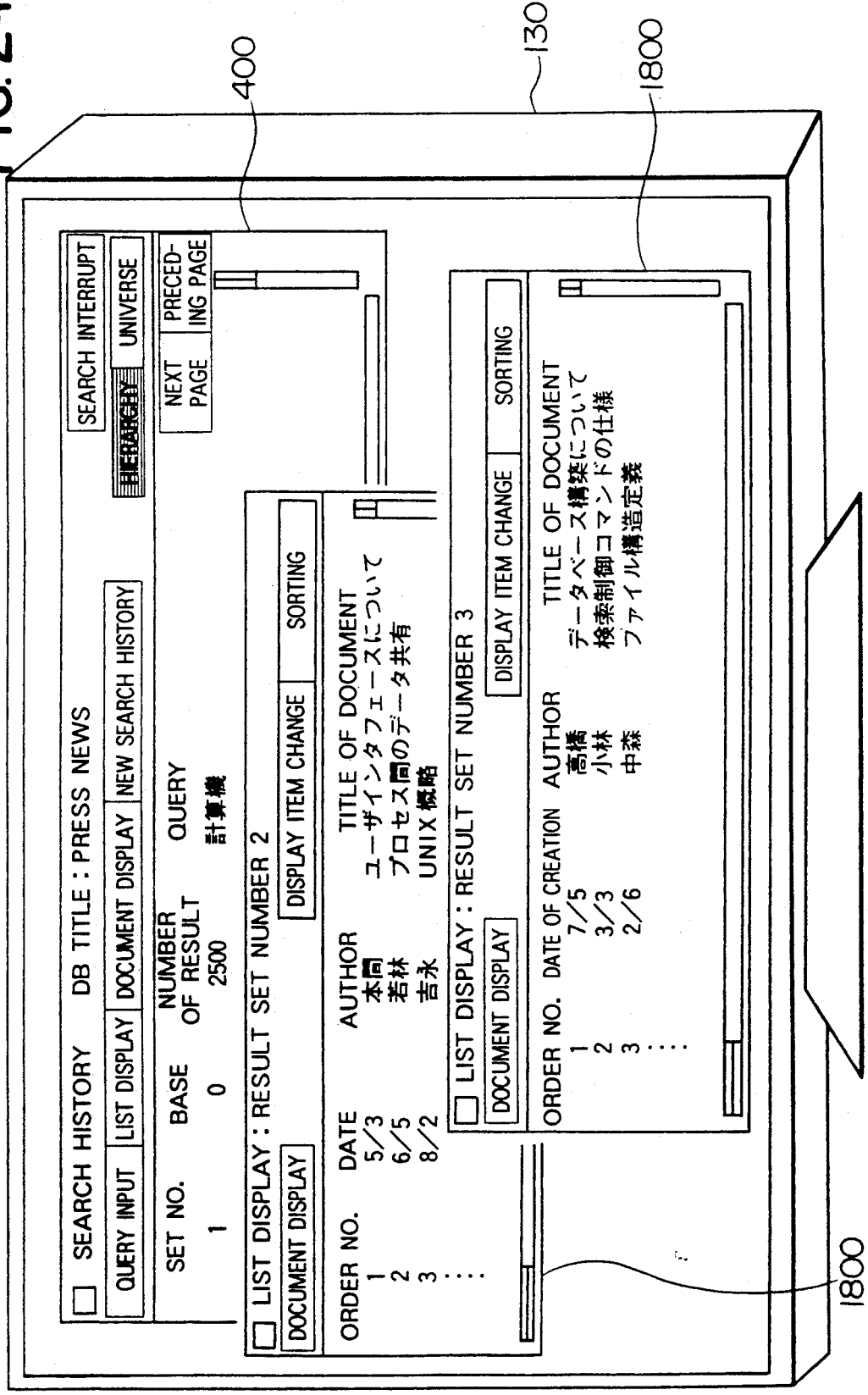
FIG. 24 is a view showing a state of display generated on the information search terminal when a plurality of list display windows are opened.

When the search is executed, starting from the search query statement input window described hereinafter (600 in FIG. 6), a blinking display "search" is generated in the column of the result number, as shown in FIG. 22. When a search interrupt menu 403 is selected in the course of executing the search, the search history display window control program 103 sends a search interrupt request to the server search system 170. In that case, an interim number of the search results obtained upon reception of the search interrupt request is displayed in the search result number column of the window. For indicating the interruption, a symbol " ✗ " is affixed to the numeral representing the search result number. By way of example, assuming that one hundred documents have been hit before the interrupt, there is displayed "100 ✗ " in the result number column.

When "new search history" is selected from the processing menu, the processing illustrated in FIG. 2 is executed once again. In other words, a database is selected, whereon the processing for opening additionally a new search history display window 400 is executed. For closing the search history display window 400 which is no more useful, the window close button 408 is clicked, as described hereinbefore by reference to FIG. 3. At this time, the database being opened is closed, whereby the search history display window 400 is also closed.

Next, a flow of the processing involved in execution of the search query input window control program 102 will be described by reference to FIG. 5 (which corresponds to the path ② in FIG. 2).

Figure 6:
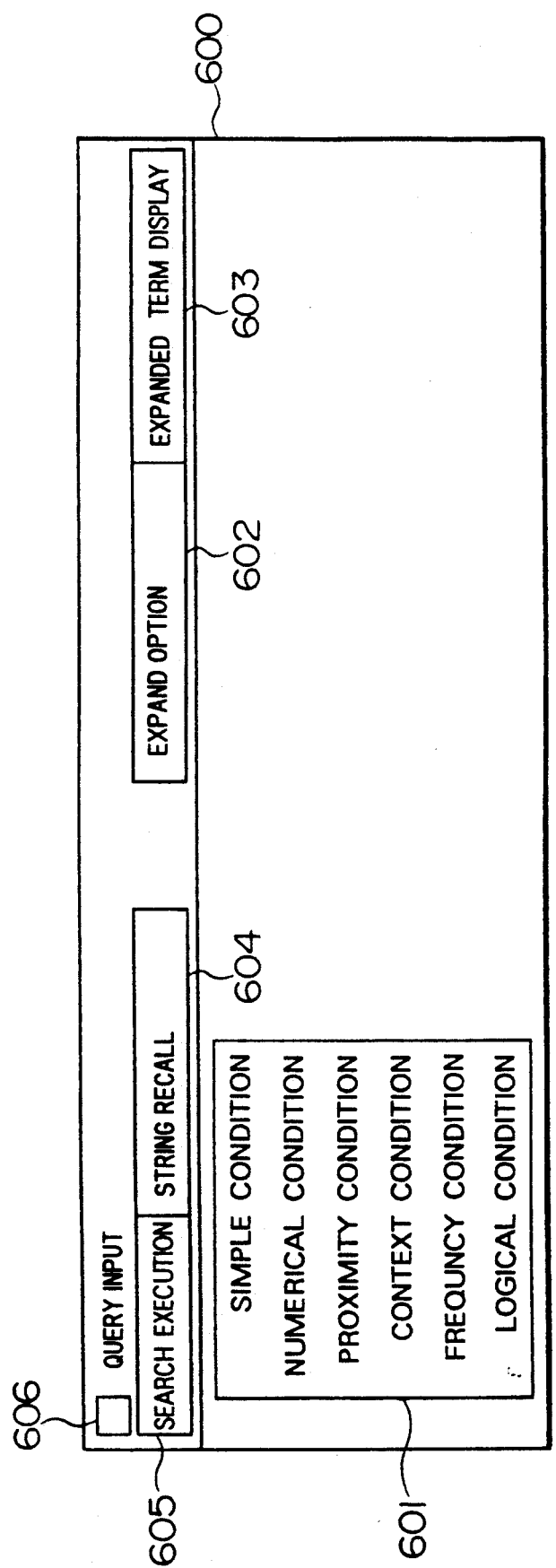
FIG. 6 is a view for illustrating an initial display configuration of a search query input window.

The search query input window control program 102 first opens a search query statement input window (600 in FIG. 6). The system is then set to the state waiting for input from the user. When it is requested to set a numerical condition, proximity condition, context condition, frequency condition or an inter-set logic condition for the search, transition is made to a window display having an input user interface suited for the input of the respective search conditions mentioned just above.

Figure 5:
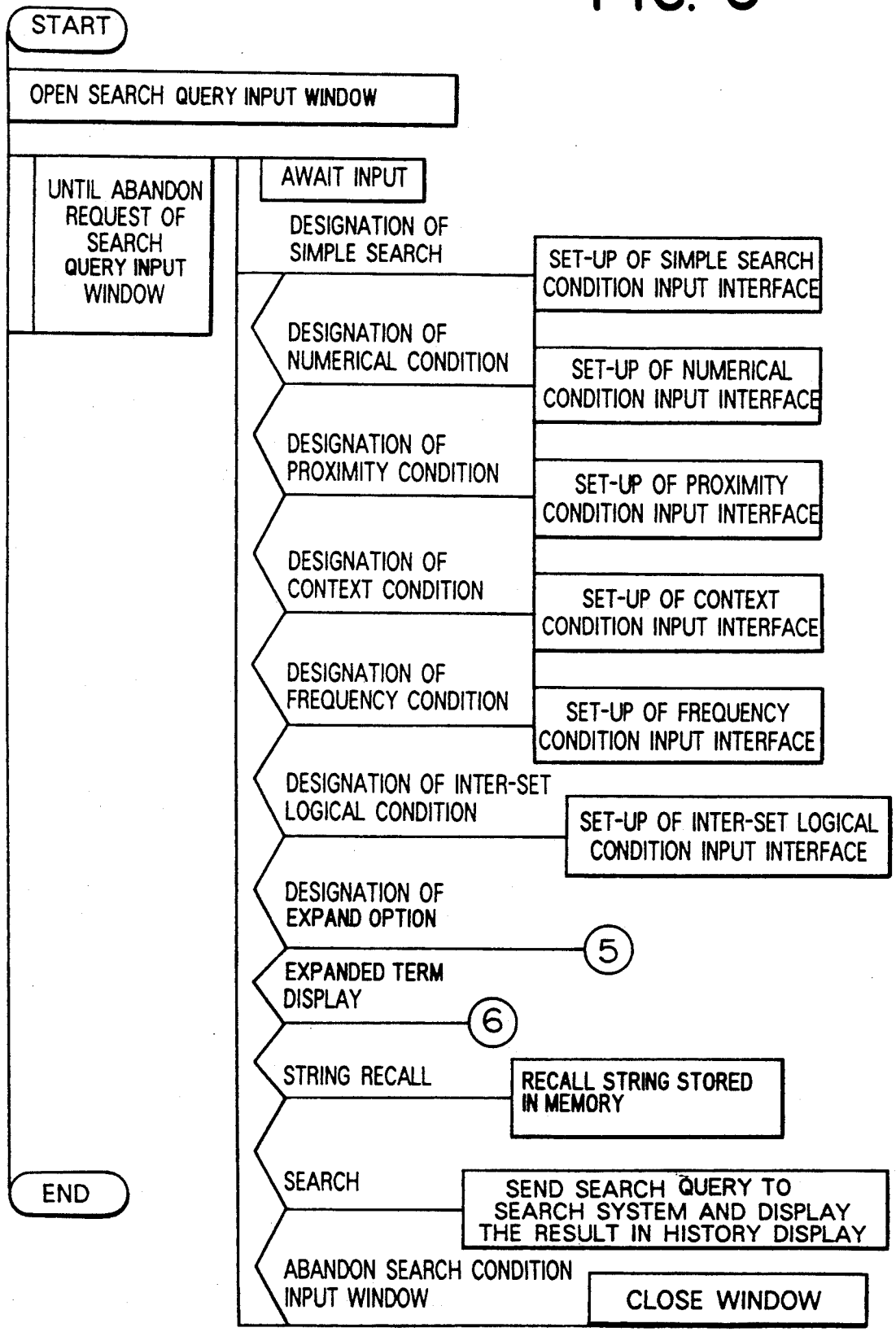
FIG. 5 is a PAD diagram for illustrating processing performed by a search query input window control facility.
Figure 13:
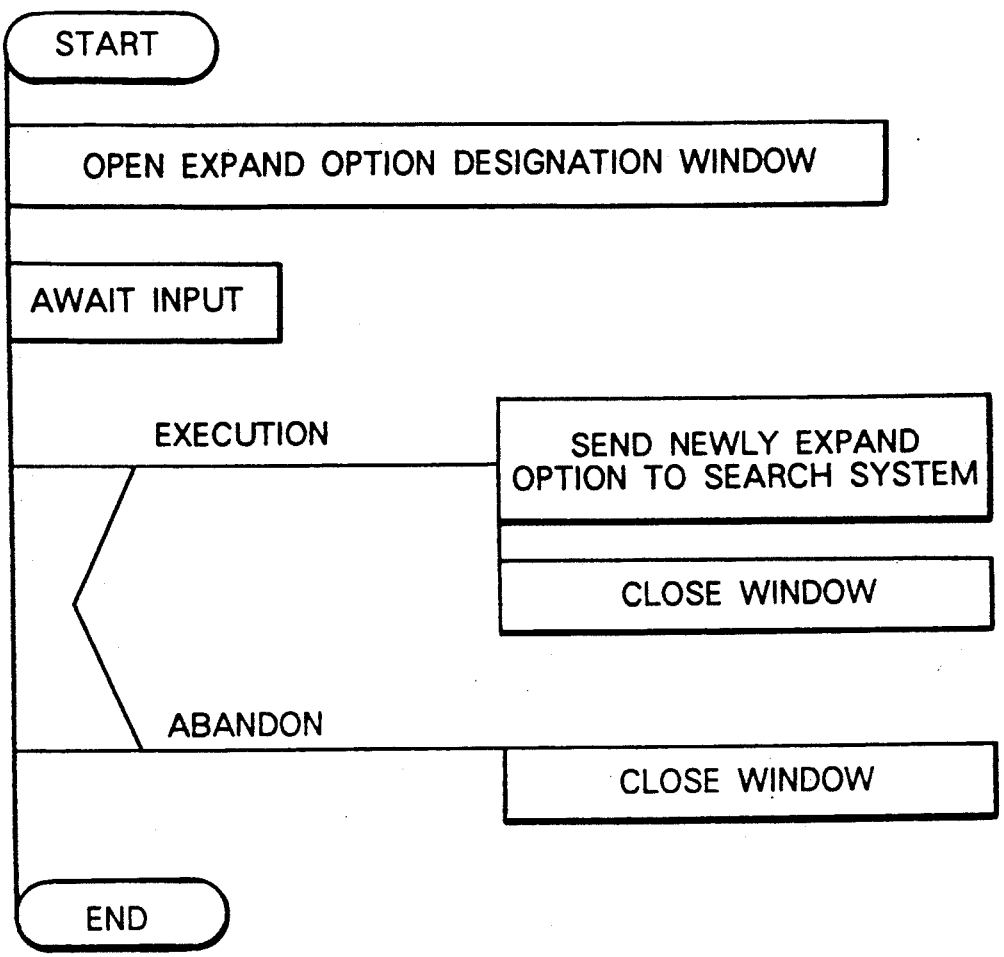
FIG. 13 is a PAD diagram for illustrating a flow of processing involved in designating development option.

When the expand option is designated, an expand option designating window 1400 is opened, as shown in FIG. 13, whereon designation of a new expand option as well as request for execution or closing is awaited (⑤ in FIG. 5). Upon inputting of the execution request, the new expaND option is sent to the search system 170, whereupon the expand option designating window 1400 is closed. For the close request, the expand option designating window 1400 is closed without sending the new expand option.

Figure 15:
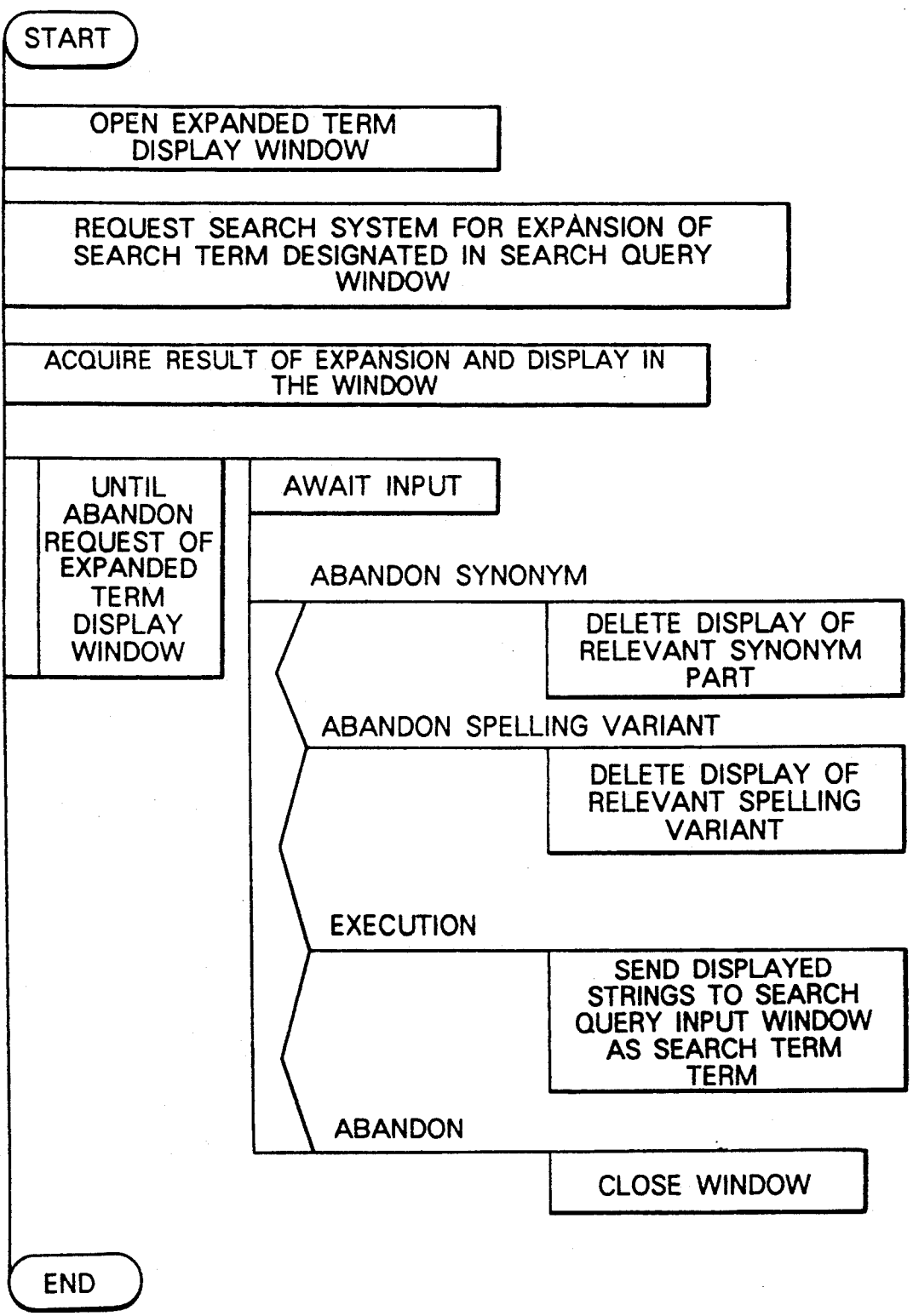
FIG. 15 is a PAD diagram for illustrating a flow of processing performed by a expanded term display window control facility.

When the expanded term display request is inputted in the condition statement input window 600, the expanded term display processing is executed (⑥ in FIG. 5). This processing will be described in detail hereinafter by reference to FIG. 15.

Upon inputting of request for recalling a character string, the character string stored in the memory is recalled through a character string cut-out processing in the document display window (2100 in FIG. 21), as will be described later on, whereupon the character string is inserted in a character string input frame of the search query statement.

Upon search request, the search query statement inputted in the search query input window 600 is sent to the search system 170. The result of the search sent back from the search system 170 is then supplied to the search history display window control program 103 to display the number of search results in the search history display window 400. After this processing, data for the list display is read out from the search system 170 and stored in the magnetic disk equipment 160.

On the other hand, in response to the request for abandonment of the search query input window 600, processing for closing the window is carried out.

Next, description will be made in detail of the input user interface display in the search query input window 600.

In the search query input window 600, a display shown in FIG. 6 is first generated. By selecting a condition from a condition select menu 601, an input interface corresponding to the designated search condition is presented.

Figure 7:
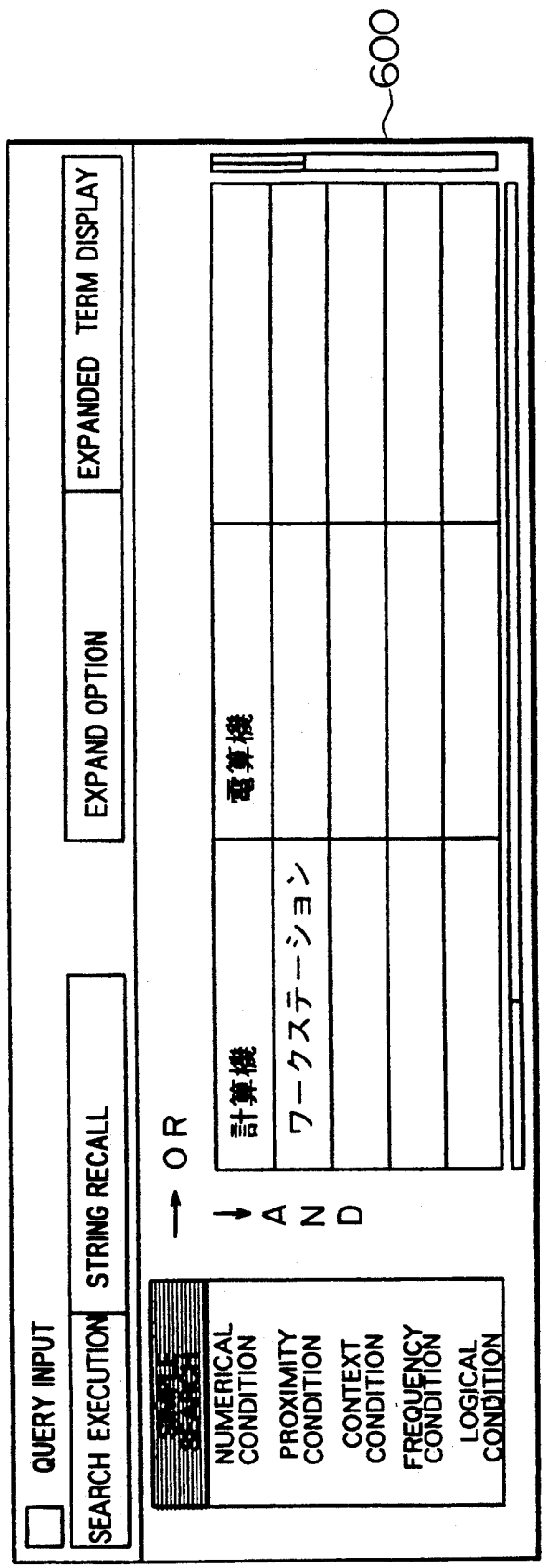
FIG. 7 is a view showing a display configuration of the search query input window upon setting of simple condition therein.

At first, description will be directed to the input user interface for the simple condition. A relevant input user interface is shown in FIG 7. As can be seen in this figure, the input user interface is presented in the form of matrix in which inter-term OR condition is indicated in the horizontal direction with inter-term AND condition being indicated in the vertical direction. In the case of the illustrated example, "計算機 (computer)" and "電算機 (electronic computer) is ORed, while "計算機(computer)" or "電算機 (electronic computer)" is ANDed with
" ワークステーション
(work station)". Namely, the undermentioned condition is shown.

(("計算機 (computer)" OR "電算機 (electronic computer)"

AND

" ワークステーション (work station)"

Figure 8:
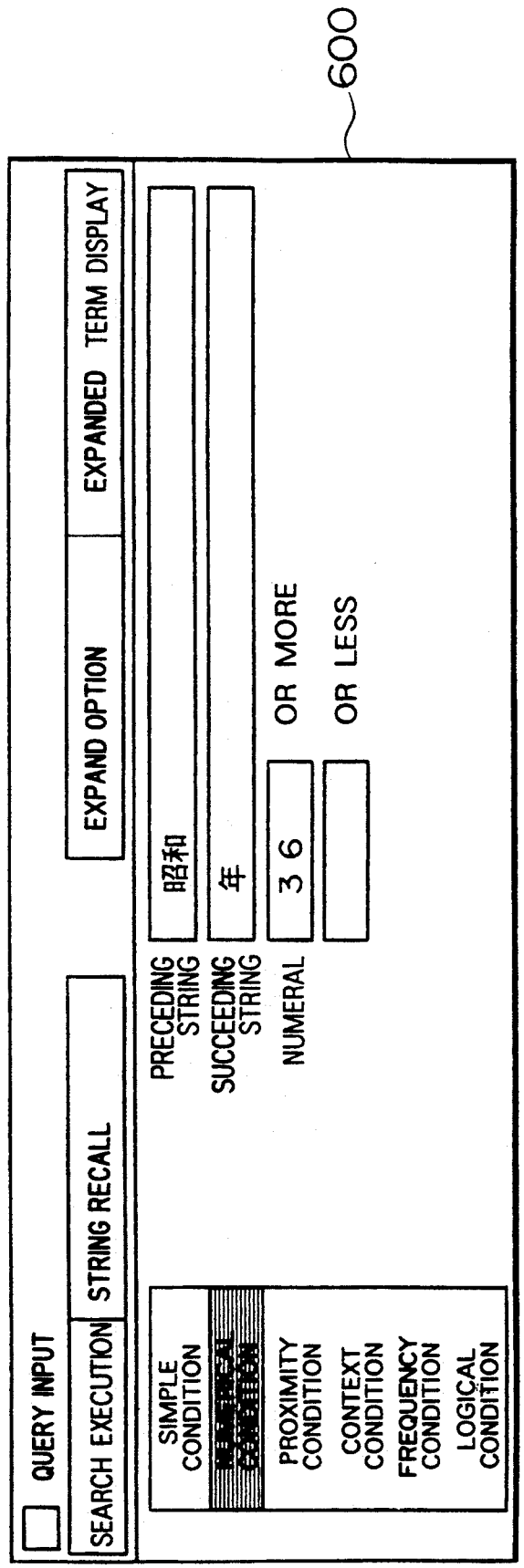
FIG. 8 is a view showing a display configuration of the search query input window upon setting of numerical condition therein.

Secondly, the numerical condition input user interface will be described. When the condition select menu 601 is selected by using the mouse, the display then transits to the input user interface of such configuration as shown in FIG. 8. In this figure, labels "preceding string" and "succeeding string" stipulate entry of character strings preceding and succeeding, respectively, to a numerical value which constitutes the condition for the search of documents. For example, in the case of the numerical value query statement illustrated in FIG. 3, such documents are searched which contain the character string having a substring " 昭和 (Showa)" preceding to the numerical value "36" and a substring " 年 (year)" succeeding to the latter and having a numerical value greater than "36. In other words, this query statement means that the documents containing the character strings which represent the years of Showa succeeding to the 36-th year of Showa inclusive thereof be searched. In the case of this illustrative example, designation of the character substrings preceding and succeeding, respectively, to the numerical value substring is required. It should however be appreciated that there are some other cases where such designation of the preceding and succeeding character substrings is not required or where designation of only one of them is sufficient. When neither prefix nor suffix character substring exist, the search query is the simple numerical search query. Accordingly, assuming in connection with the example shown in FIG. 8 that neither prefix " 昭和 " nor the suffix " 年 " is designated, those documents which contain character strings representing numerical values greater than "36" inclusive are searched.

Figure 9:
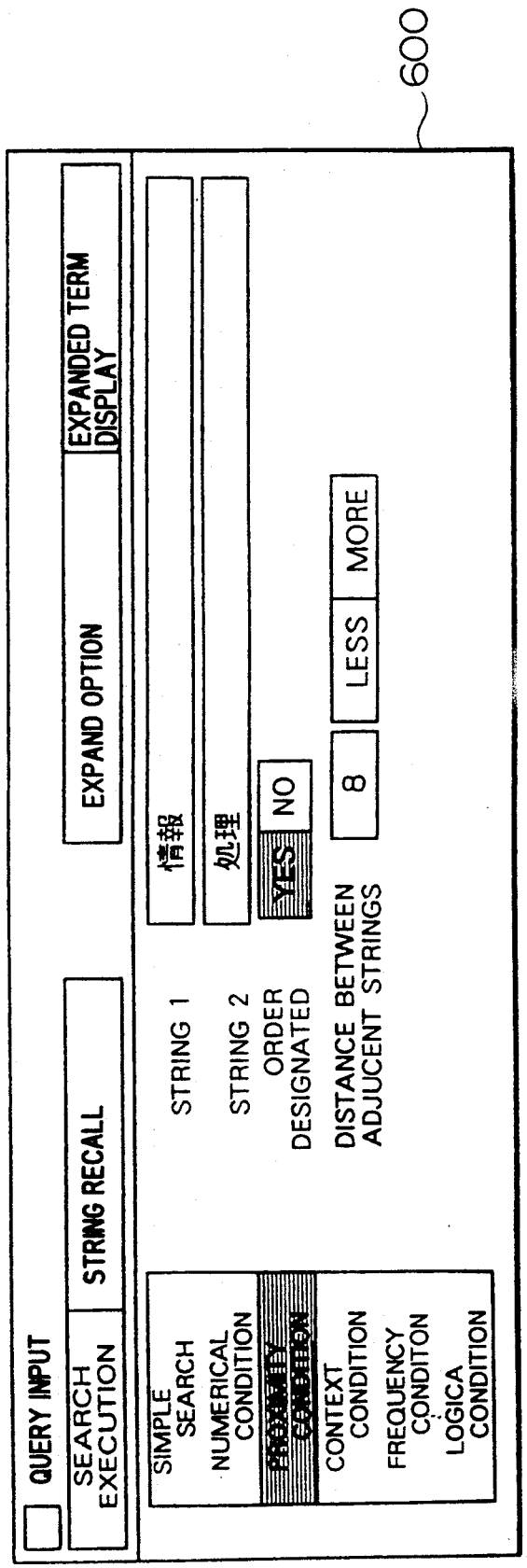
FIG. 9 is a view showing a display configuration of the search query input window upon setting of proximity condition therein.

Next, proximity condition input user interface will be described. When the proximity condition is selected from the condition select menu 601 by manipulating the mouse, the screen display transits to the display of the input user interface having such a configuration as shown in FIG. 9. With the proximity condition search, it is meant that such documents be searched which contain two designated character strings with a distance therebetween which is shorter or greater than a predetermined number of characters. In that case, the order in which the two designated character strings should make appearance can be designated as well. In other words, when two character strings are designated together with the order in which they should make appearance, such documents are searched which contain these character strings at the distance satisfying the inter-string distance condition and in which these character strings occur in the designated order.

Figure 10:
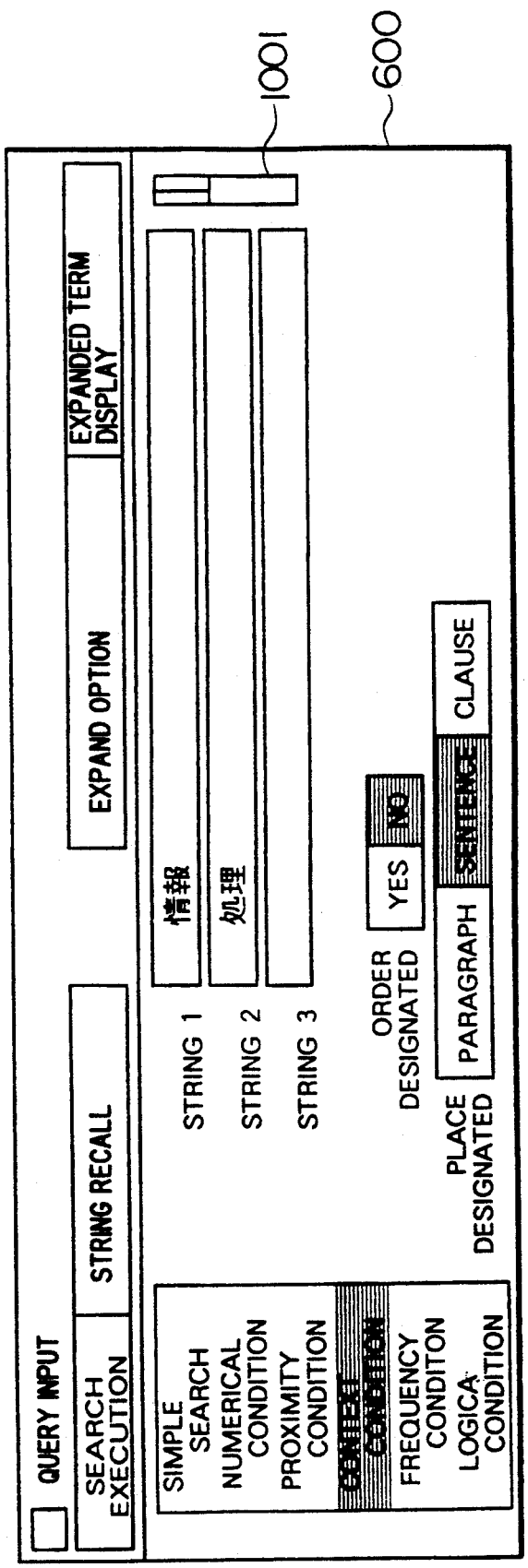
FIG. 10 is a view showing a display configuration of the search query input window upon setting of context condition therein.

Fourthly, the context condition input user interface will be described. When the context condition is selected from the condition select menu 601 by using the mouse, the input user interface display of such a configuration as shown in FIG. 10 is generated. With the context condition search, it is meant that such a document is to be searched which contains the designated character strings occurring simultaneously in a same paragraph, a same sentence or a same clause. It is equally possible to designate the order in which a number of the designated character strings should make appearance in sequence, as in the case of the proximity condition search described above. A scroll bar 1001 shown in FIG. 10 is used for scrolling a character string designating area for designating three or more character strings.

Figure 11:
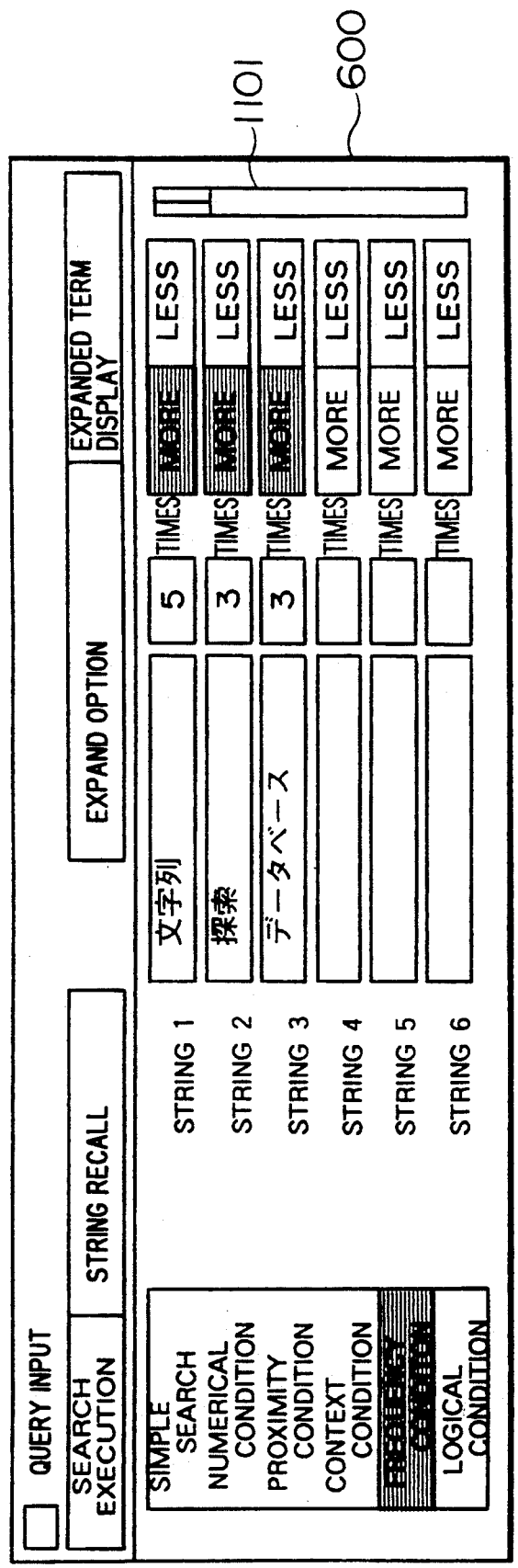
FIG. 11 is a view showing a display configuration of the search query input window upon setting of frequency condition therein.

Fifthly, a frequency condition input user interface will be described. By selecting the frequency condition from the condition select menu 601 with the mouse, an input user interface of such configuration as shown in FIG. 1 is generated. With the frequency condition search, it is intended to mean that such a document be searched in which a designated character string occurs at a frequency greater or smaller than a designated number of times. In FIG. 11, a scroll bar 1101 is used for scrolling the character string designation area when six or more character strings are to be designated.

Figure 12:
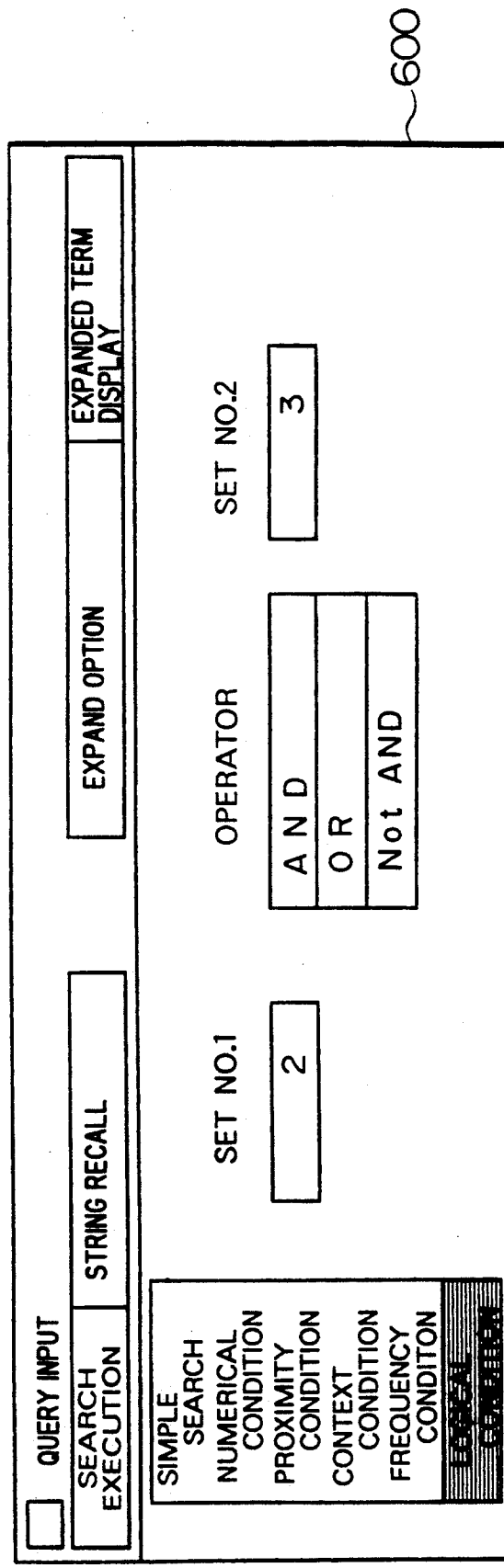
FIG. 12 is a view showing a display configuration of the search query input window upon setting of logical condition therein.

As the final variation of the condition statement input user interface, description will be made of a logical condition input statement. When the logical condition is selected from the condition select menu 601, the screen display shifts to an input user interface display of such configuration as shown in FIG. 12. With the logical condition, it is contemplated to determine a logical product or logical sum between sets of search results. In the case of the input user interface illustrated in FIG. 12, logical product (AND) condition, logical sum (OR) condition and logical negation (Not AND) condition can be designated for two sets of search results. Assuming that the Not-AND operation is designated, such search query is validated for the set of the search results (searched documents) identified by the set number "1" that other documents than those contained in the set "2" should be selected from the set "1".

From the above description, it will be understood how the input user interface configuration can be prepared for the diverse search queries. Next, description will turn to description in general of the processing executed in conjunction with the search query statement input window 600.

Figure 14:
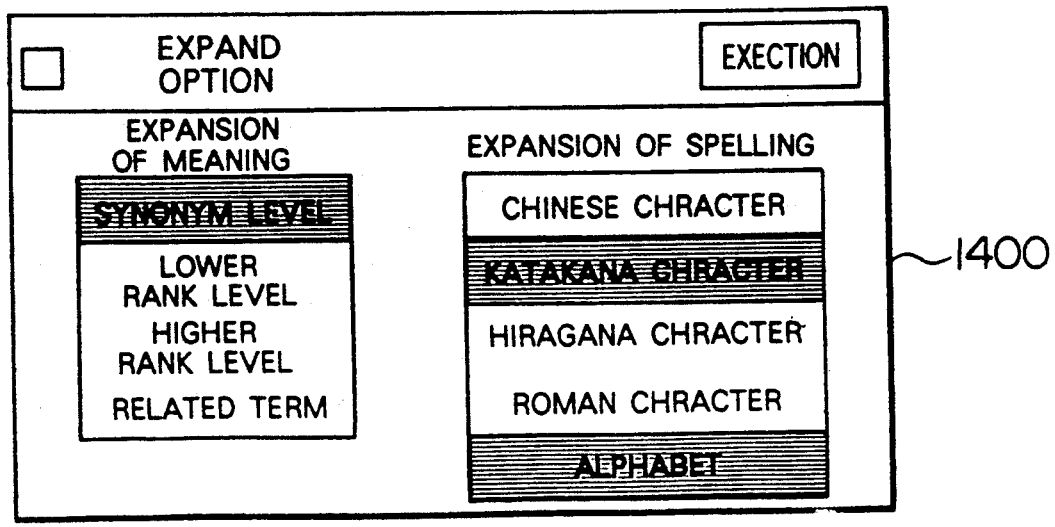
FIG. 14 is a view showing a display configuration of a development option designating window.

When the expand option menu 602 is selected from the search query input window 600, an expand option setting processing illustrated in FIG. 13 is executed (refer to ⑤ in FIG. 5). The processing for setting the expand option is enabled by opening an expand option designating window 1400 and selecting relevant items by using the mouse. In the case of the example illustrated in FIG. 14, there is designated a synonym-level expand processing in combination with katakana/alphabetic spelling variant expand processing. This designation can be realized by picking up the items which are to be expanded. For resetting the items selected for expansion to the non-selected state, this can be achieved by picking up these items once again by manipulating the house.

When an expanded term display menu 603 is selected in the search query input window 600, an expanded term display window control program 106 is activated, whereby display processing for displaying the expanded terms (character strings) which are automatically expanded and searched by the search system as well as processing for selection of the expansions (results of expand processing such as expanded terms) is activated. With the phrase "expanded terms", it is intended to mean those terms which are expanded automatically upon document search by the search system 170 on the basis of the information loaded in the expand menu and which may include synonyms and alphabetic spelling variants. In more concrete, the expanded term display window (1600 in FIG. 16) is opened, and the search term in the search query input window 600 is transferred to the search system 170, whereon the result of expansion as sent back is displayed in the expanded term display window 600. Subsequently, the user input is waited for. When the synonym abandon request is inputted, a part of the expanded terms which corresponds to the designated synonym is canceled. Similarly, in response to the spelling variant abandon request, display of the corresponding spelling variants is canceled. Upon input of the execution request, the expanded term being currently displayed is placed in the search query input window 600 as the search term. Further, in response to the close request, the processing for closing the expanded term display window is performed.

Figure 16:
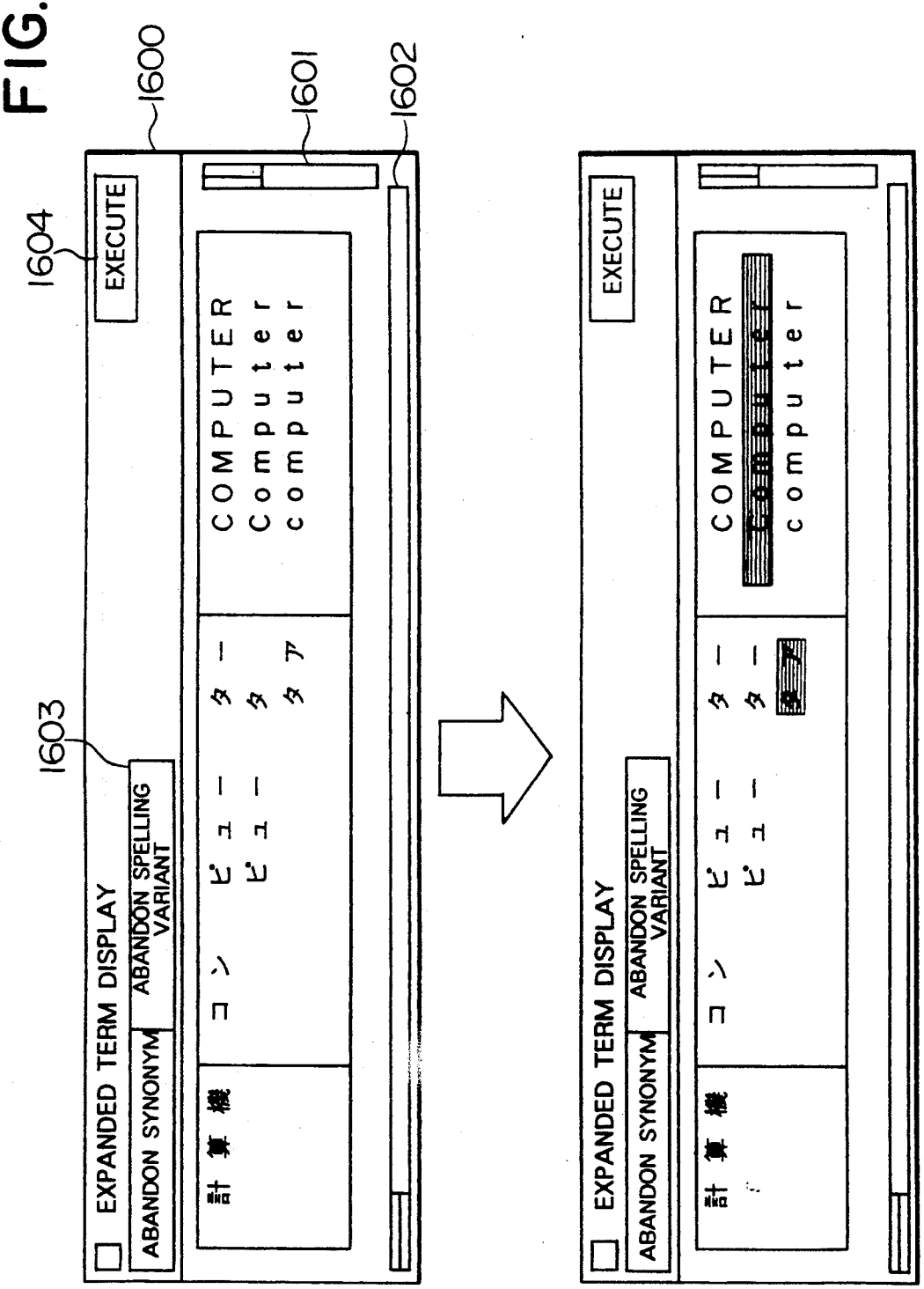
FIG. 16 is a view showing a display configuration of a expanded term display window.

More specifically, the search term inputted in the search query input window 600 is picked up, whereon the expanded term display menu is selected. Then, the expanded term display window control program 106 sends the search term to the search system 170, being then followed by reception of the result of term expansion from the search system 170. Thereafter, the result of expansion classified on a synonym basis is displayed in such a manner as shown in FIG. 16. In this case, the result of expansion for the search term "計算機 (computer" is illustrated, by way of example. The spelling variants resulting from the expand processing are shown in the vertical direction with the synonyms being displayed in the horizontal direction.

The display of the spelling variants is so effected that spelling variants are displayed in parallel for each of fragmental character strings or character substrings. In the case of the example illustrated in FIG. 16, the substring " ピュ - (pu)" is expanded into two spelling variants, i.e., " ピュ - " and " ピュ ウ ", while substring "ター (ter)" is expanded into three spelling variants (i.e., "ター", " タ " and "ッT". Thus, there are displayed as the result of expansion six variants of character string in total of combinations of the substrings mentioned above. When the results of expansion are too many to be displayed within the window, remaining spelling variants can be referenced by manipulating the scroll bar 1601 while the remaining synonyms can be referred to with the aid of the scroll bar 1602.

Furthermore, in the expansion result display window 1600, any extraneous expansions can be abandoned so that the document search can be carried out with the desired character string as expanded. More specifically, portion of the expanded terms which are to be deleted are designated by using the mouse. Subsequently, from the select menu 1603, either "synonym abandon" or "spelling variant abandon" being displayed is selected with the mouse. In the case of the synonym abandonment, the synonym as selected is canceled as a whole independent of which substring of the synonym is designated by the mouse cursor. For example, when a substring " ピュ - " is designated, the whole string " コンピュータ - " is deleted in the case of the synonym abandonment. On the other hand, in the case of abandonment of the spelling variant, only the character substring designated by the mouse cursor is deleted. For example, in the above-mentioned case, only the substring " ピュ - " is deleted, which results in that three different spelling variants developed concerning the substring "ター" remain valid. When the execute key 1604 is selected by the mouse cursor in this state of the expanded term display window 1600, the contents selected in the manner described above are designated as the expanded terms of the search term selected in the search query input window 600.

Again, the search query input window 600 shown in FIG. 6 is restored. By selecting the string recall menu 604, the character string(s) stored in the work memory 107 secured on the memory 110 (described hereinafter in conjunction with the document display window 2100 shown in FIG. 21) can be reused as the search term. By referring to FIG. 9, "string 1" is first selected, which is followed by selection of "string recall". Then, the character string stored in the work memory 107 is copied into a field labeled "string 1".

When the search execution menu 605 is clicked, the contents set up in the search query input window 600 are assembled into the query statement and transferred to the search system 170. Thereafter, the information concerning the number of the search results from the search system 170 is waited for. Upon reception of the search result, the number of the results is displayed by the search history display window control program 103. The bibliographic item data required for the list display are previously read out from the search system and stored in the magnetic disk equipment 160 which serves as a work file for the client terminal apparatus.

As the description of the user interface for loading the search queries has now been completed, the list display window (1800 in FIG. 18) will next be described.

Figure 17:
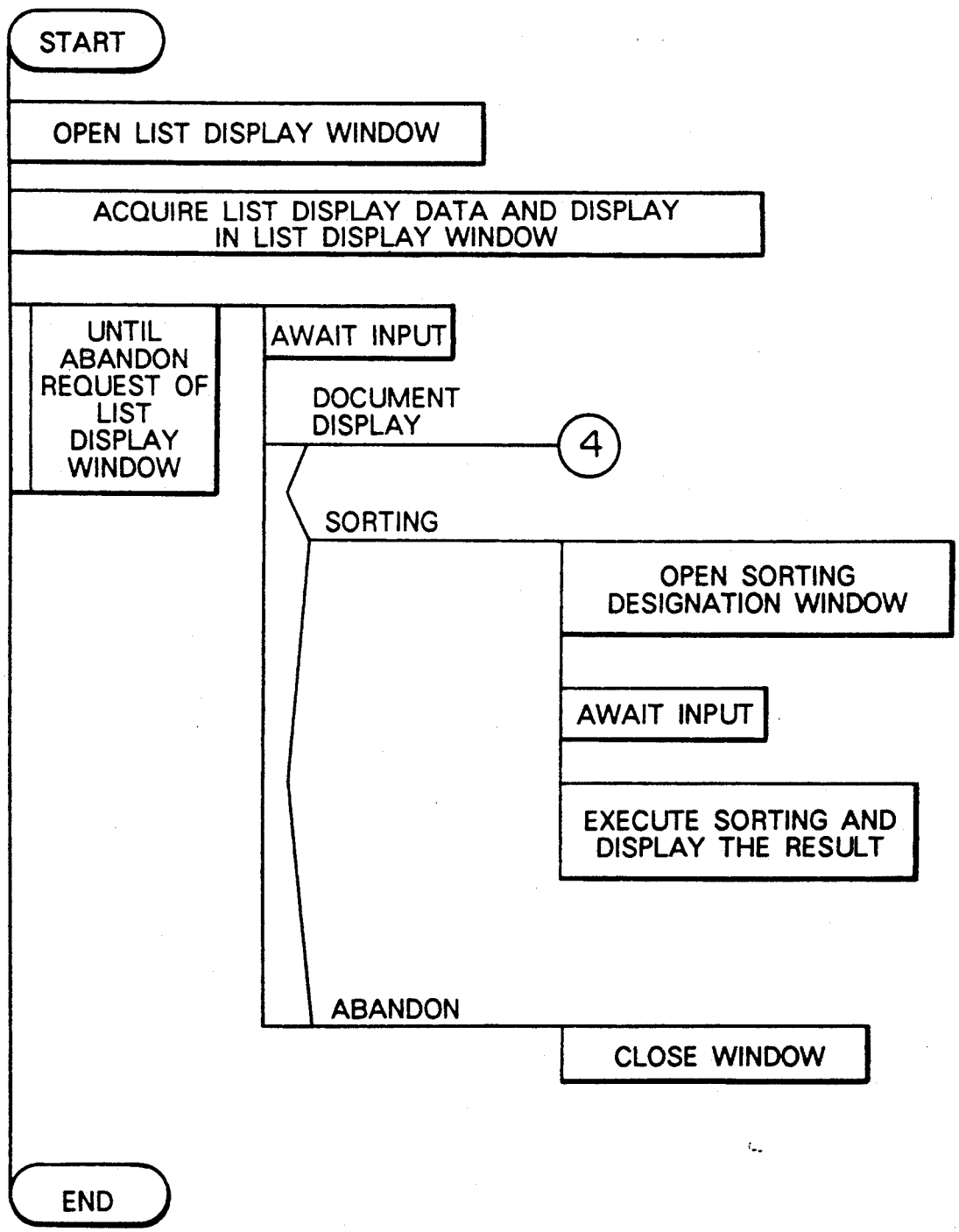
FIG. 17 is a PAD diagram for illustrating processing performed by a list display window control facility.
Figure 20:
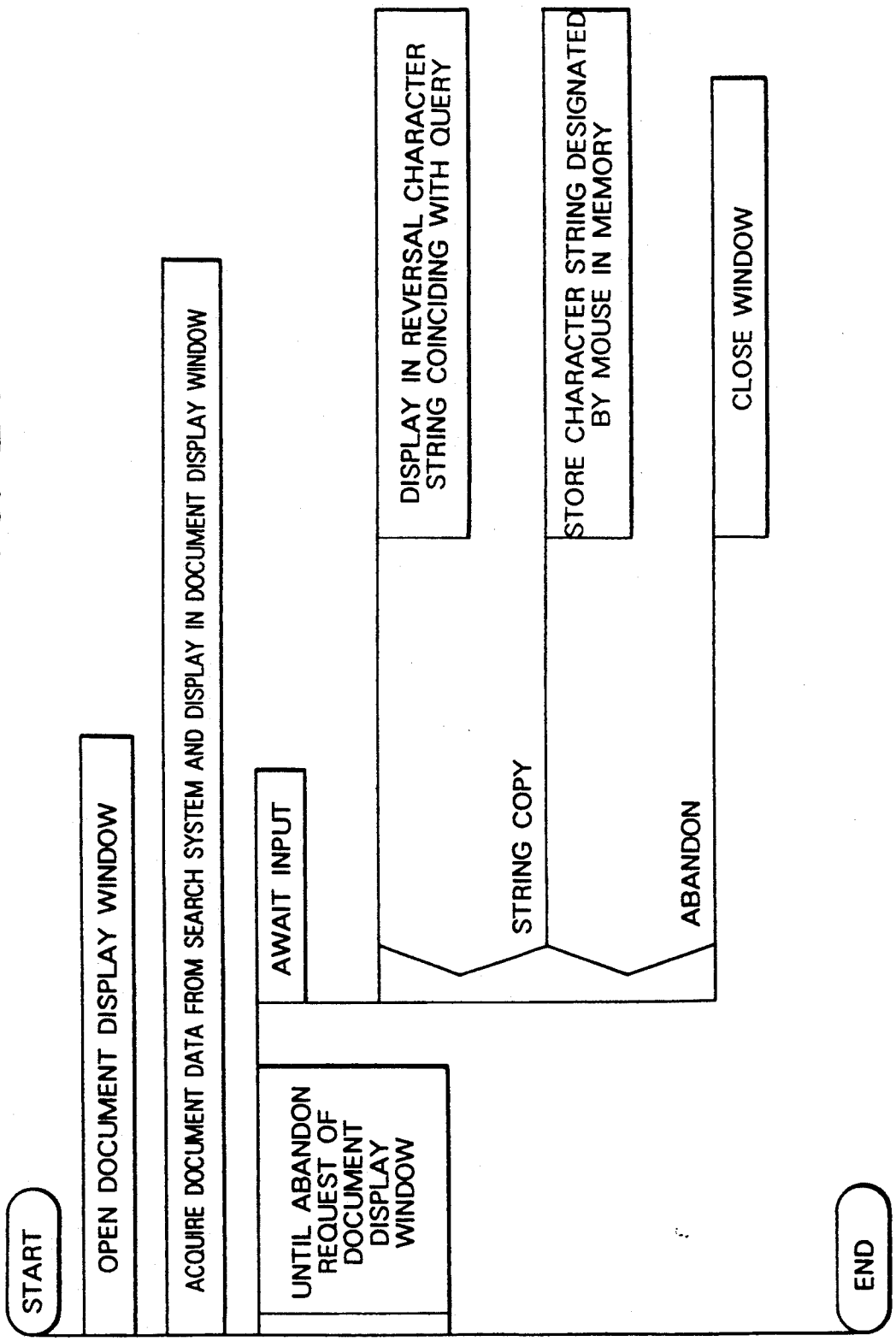
FIG. 20 is a PAD diagram for illustrating processing performed by a document display window control facility.

For displaying in a list the bibliographic items of the search results such as title of document, date of creation and author, the set number 404 is selected from a plurality of search histories displayed in the search history display window 400 shown in FIG. 4, to thereby designate a result set to be displayed in a list. Next, "list display" is selected from the select menu 401 (③ in FIG. 2). Then, the list display window control program 104 is activated to perform a list display processing shown in FIG. 17. Namely, a list display window is opened, whereon list display data acquired from the server search system 170 immediately after the search processing and stored in the magnetic disk equipment 160 are displayed in the list display window 1800. Now, the search terminal waits for the user request input. When the document display request is inputted by the user, the document display window control program 105 is activated to display the document as required (④ in FIG. 17). Description concerning the processing performed by the document display window control program 105 will hereinafter be made in detail by reference to FIG. 20.

Figure 19:
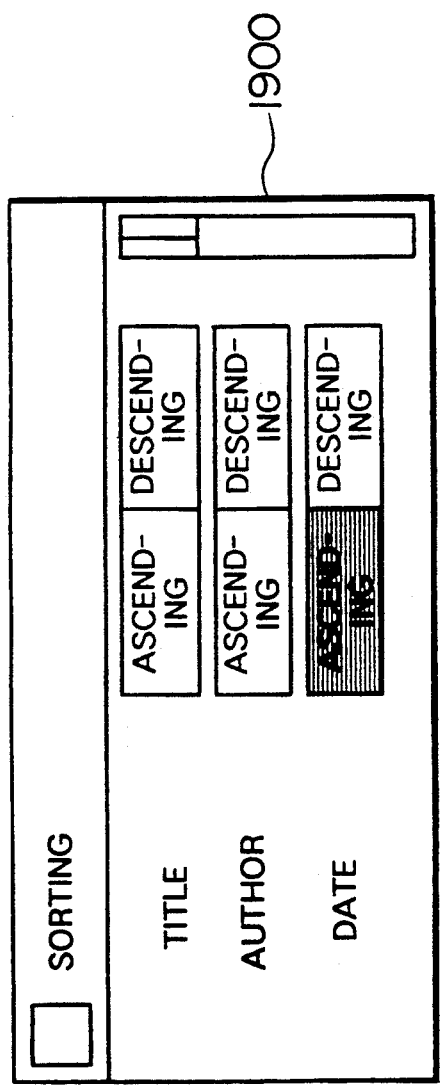
FIG. 19 is a view showing a display structure of a sort designating window.

In case a sorting request is inputted, a sorting designation window 1900 shown in FIG. 19 is opened, whereon the sorting is executed in accordance with the conditions inputted by the user concerning the item for which data are to be arrayed or sorted in an ascending or descending order. The rearranged data are then displayed in a list.

When the abandon request is inputted, a processing for closing the list display window 1800 is executed, as in the case of the search history display window 400 and the search query input window 600 described hereinbefore.

Figure 18:
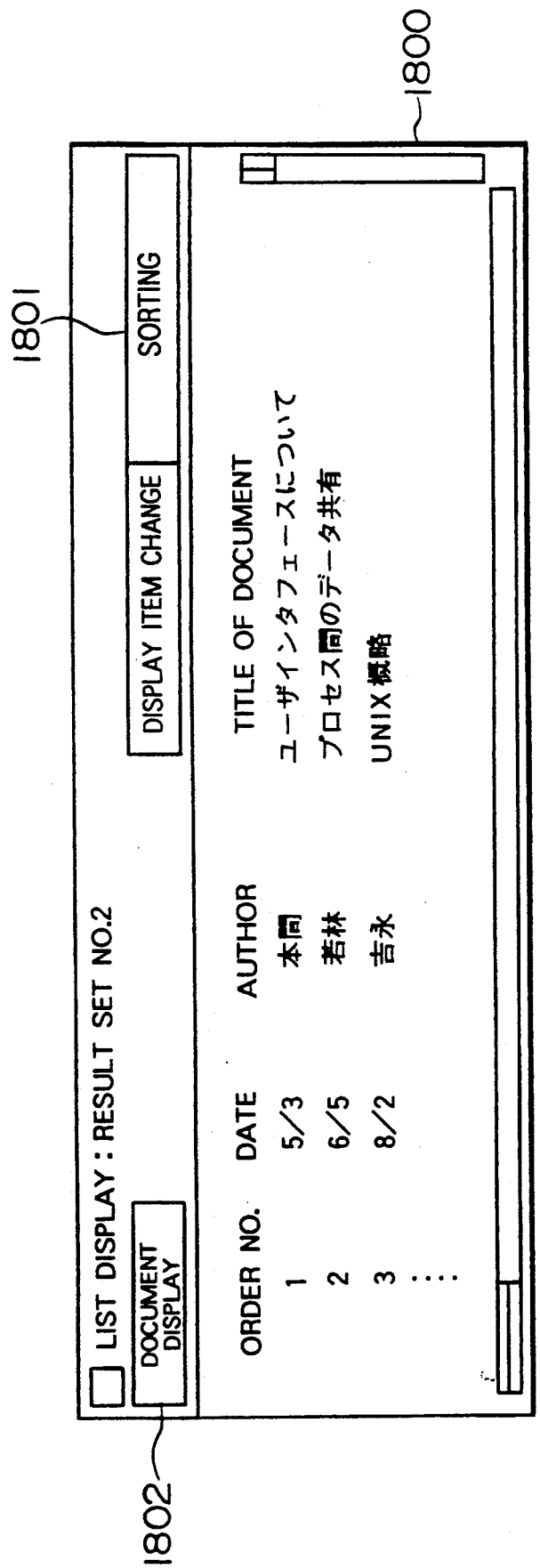
FIG. 18 is a view showing a display configuration of a list display window.

The list display window 1800 has a structure shown in FIG. 18. In this figure, a field labeled "display item change" contained in the area of the selection menu 1801 is used for changing the items being displayed in a list such as "date of creation", "author", etc. to other items. By way of example, let's assume that a lot of items such as "date of creation", "author", "title of document", "number of pages", "document serial number", "storage file name", "relate document", "date of registration" and the like are registered as the data to be displayed in the list. In that case, in the initial list display, "data of creation", "author" and "title of document" will be displayed as default data. By selecting the display item change from the select menu, it is possible to change the data item to be displayed in the list to "document serial number", "title of document" and "storage file name".

In order to display the document data, more than one data item numbers displayed in the list display window 1800 are selected and then the document display menu 1802 is selected. Similar document display can be generated, starting from the search history display window 400. In this case, the set number is first designated, whereon the document display is selected from the select menu 401. In case the document display is effectuated, starting from the search history display window 400, all the documents contained in the search result set are subject to the display.

Finally, the processing of the document display window control program 105 will be described. Upon activation of the document display window control program 105 from the list display or search history display, processing shown in FIG. 20 (corresponding to ④ in FIGS. 2 and 17) is performed. At first, a document display window 2100 is opened, whereon the document data received from the server search system 170 is displayed in the document display window 2100. Subsequently, user request input is awaited. When a search term highlight display request is inputted, the character strings contained in the document being displayed and coinciding with the search query are displayed in reversal. In case a character string copy request is inputted, a given character string contained in the document data and designated by the mouse cursor is stored in the work memory 107 on the memory 110 so that the search query input window control program 102 can recall this character string.

On the other hand, when a document abandon request is inputted, processing for closing the document display window 2100 is executed in a similar manner as all the other window closing processings.

Figure 21:
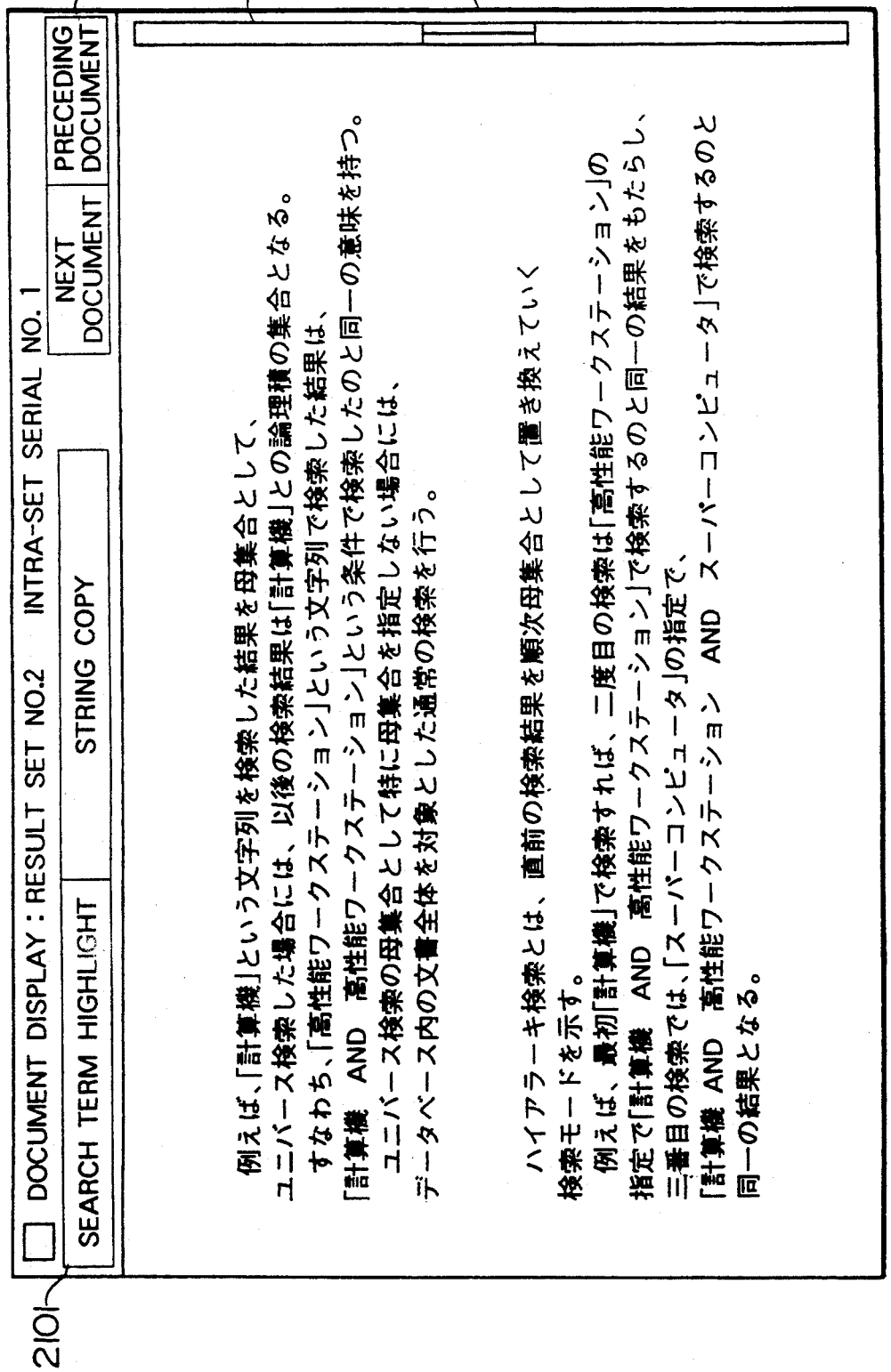
FIG. 21 is a view showing a display configuration of a document display window.

Referring to FIG. 21, the document display window 2100 is so structured as to include the information concerning the number of the result set which contains the document being displayed, intra-set serial numbers for identifying the documents, next/preceding document designation menu for enabling document change within the set, the search term highlight which is one of the main processings in the document display window and a processing select menu for selecting character string copy. In FIG. 21, the intra-set serial number corresponds to the item number in the various display windows and represents the ordinal number of a given document in the set.

When "search term highlight" is selected from the select menu 2101, the character string which coincides with the search query at the time the associated result set is obtained is changed in color or displayed in reversal to thereby highlight or feature the character string in such a manner as is illustrated in FIG. 23. When the character string copy is designated, the character string as designated by the mouse cursor in the document data being displayed is copied to the work memory 107 on the memory 110. This copied data can be recalled in the search query input window to be used again as the search term.

When the amount of document data is too large to be displayed within a single window, the remaining portion of that document data can be displayed by manipulating a scroll bar 2103.

In case a plurality of document designations are inputted, other documents can be displayed by making use of a next/preceding document designation menu 2102.

In the foregoing, description has been made in detail of the individual functions of the various window control programs and search processing flows. These windows are saved and can be displayed with the control programs associated with the windows which are in the state for awaiting user requests for the respective processing menus independent of one another so long as the abandon button is not actuated by the user. Consequently, the list display can be designated at any time, starting from, for example, the search history display window 400. In that case, in response to every list display designation, the list display window control program 104 is actuated, whereby the search result list displays are generated in the respective windows. Thus, any number of the list display windows 1800 can be opened for allowing a plurality of search results to be reviewed by the user.

Figure 25:
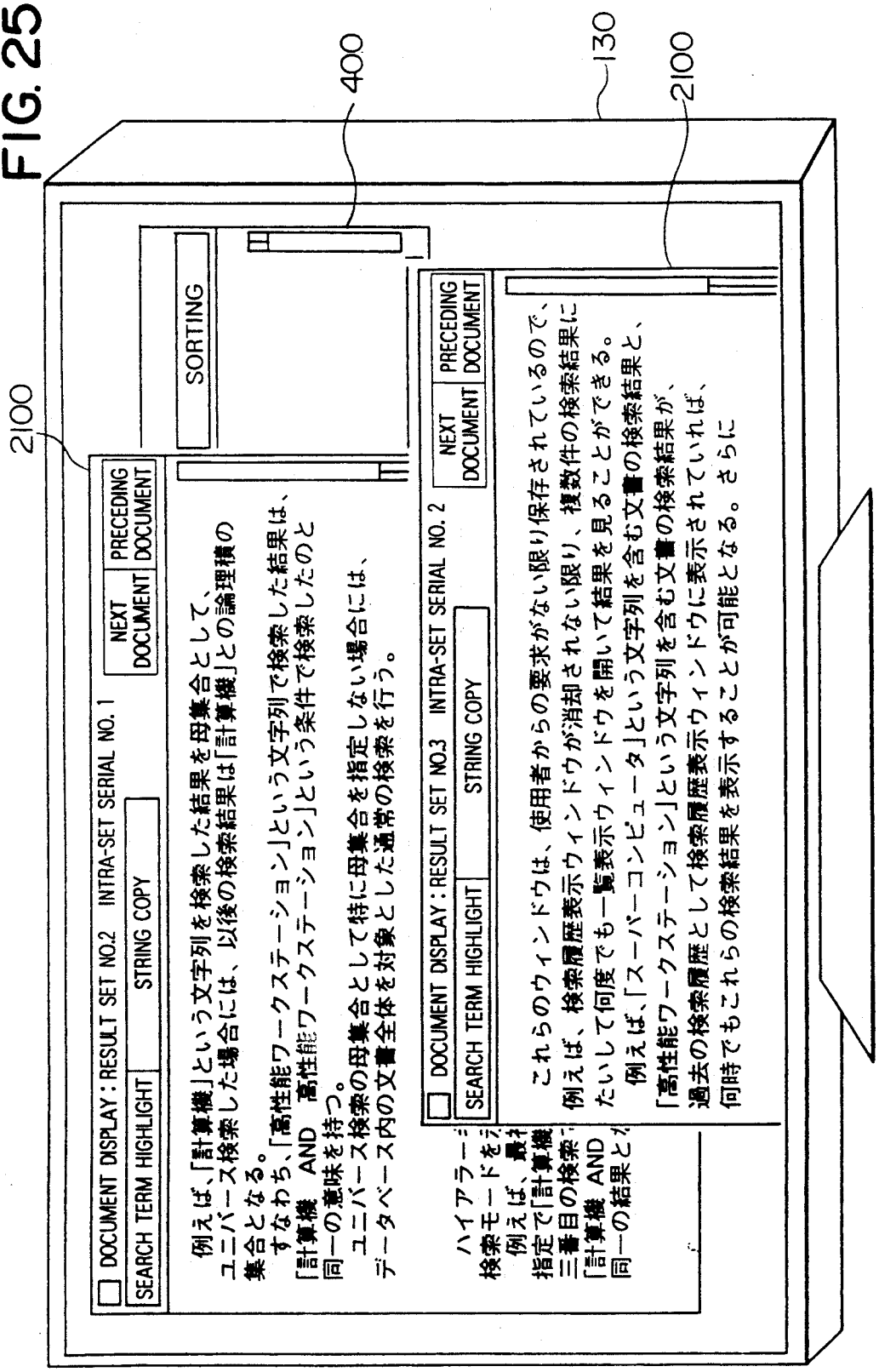
FIG. 25 is a view showing a state of display generated on the information search terminal when a plurality of document display windows are opened.
Figure 26:
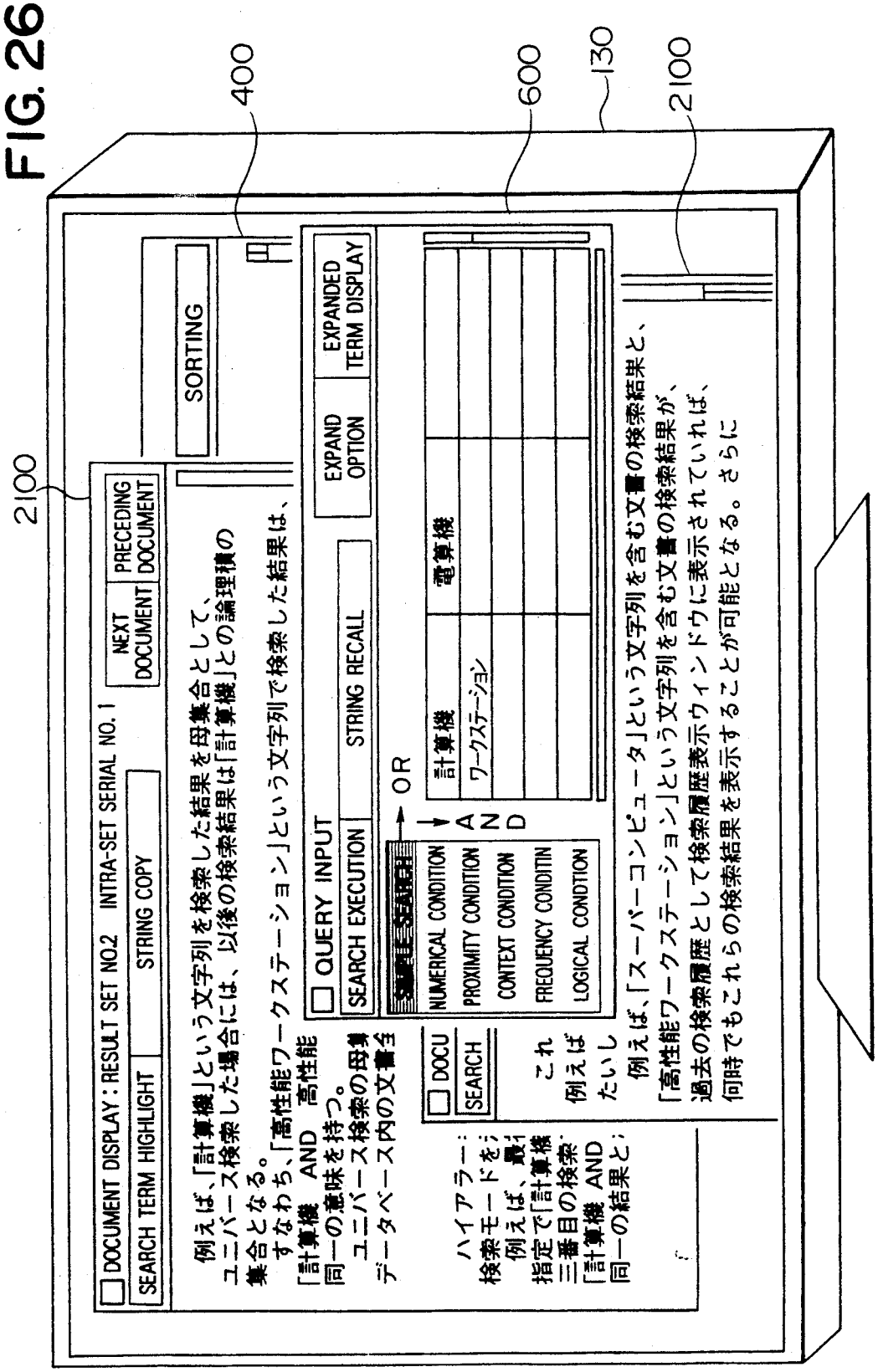
FIG. 26 is a view showing a state of display generated on the information search terminal when a succeeding search query input window is opened in the state in which the document display window is being generated.

Similarly, by saving rather than abandoning the document display window 2100 activated from the list display window 1800 or from the search history display window 400, a plurality of documents can be comparatively reviewed, as is illustrated in FIG. 25. Furthermore, by saving the document display window 2100 and the search query input window 600 without abandoning them, a given term in the document can easily be inputted as the search term because any succeeding search query can be inputted while watching the document, as shown in FIG. 26, to an advantage.

Figure 27:
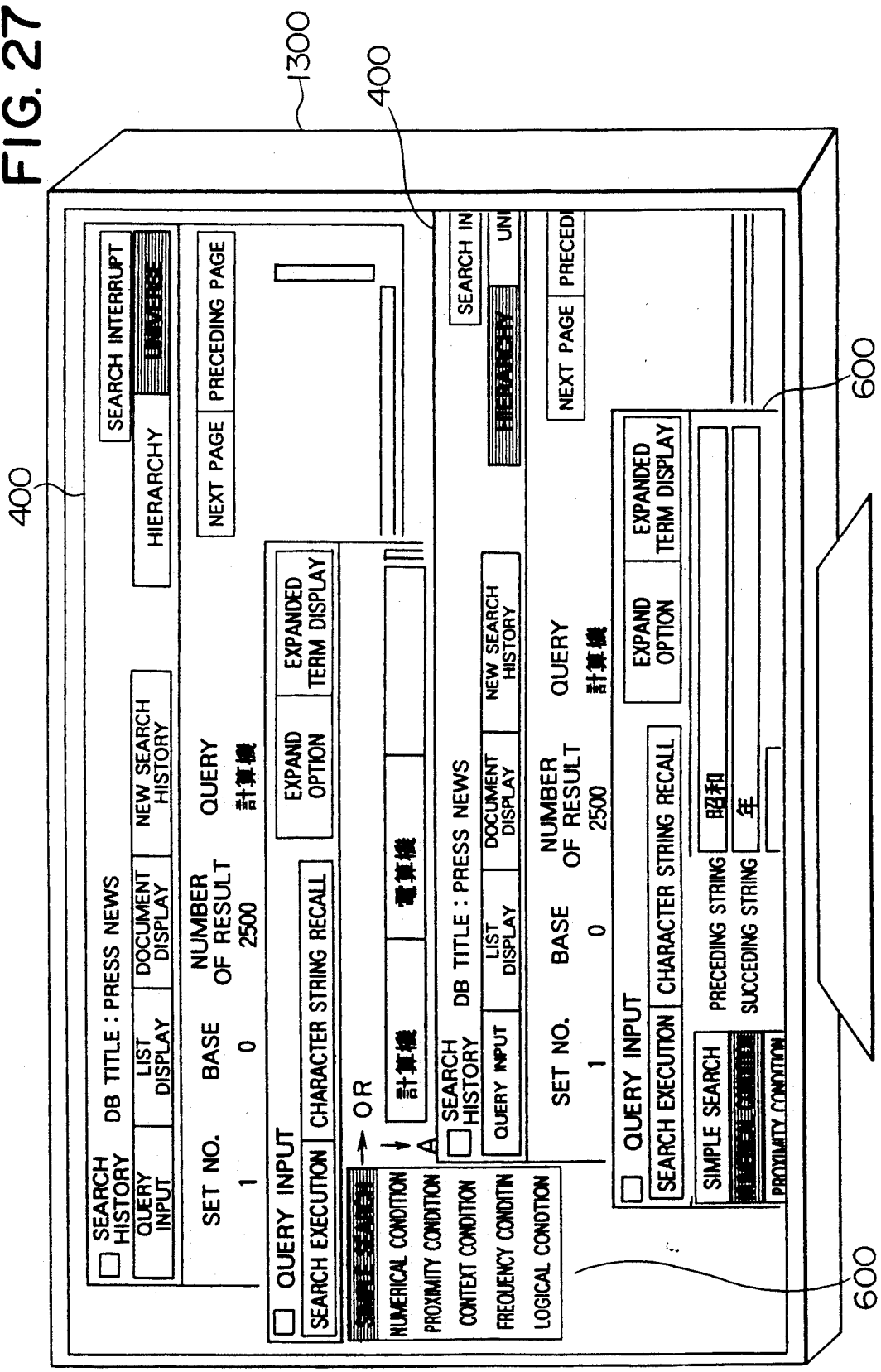
FIG. 27 is a view showing a state of display generated on the information search terminal when a history display window and a plurality of corresponding search query input windows are opened.
Figure 28:
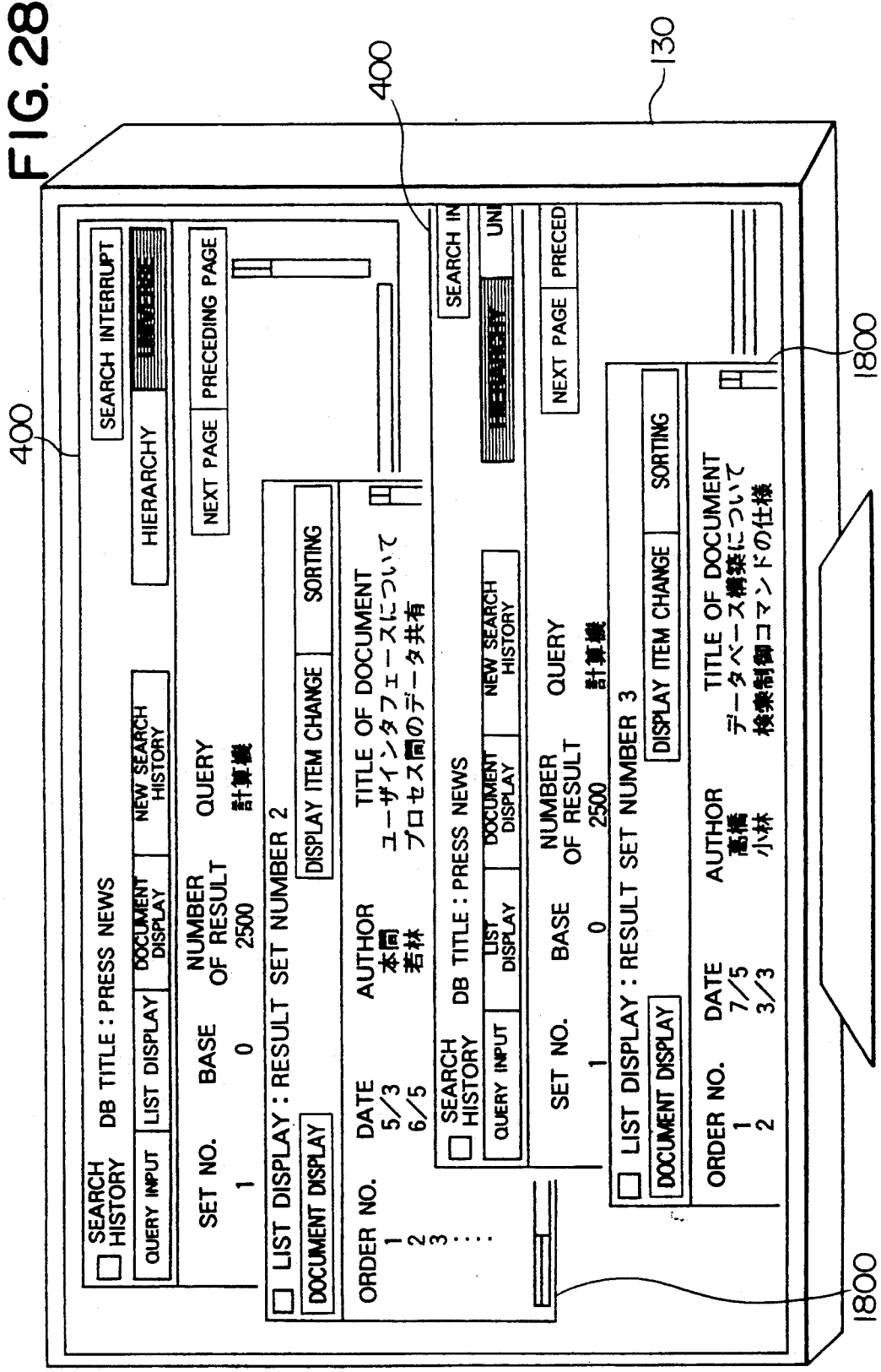
FIG. 28 is a view showing a state of display generated on the information search terminal when a history display window and a plurality of corresponding list display windows are opened.

In connection with the search query input window 600 and the search history display window 400, a plurality of windows can separately be used simultaneously, whereby the search terminal enjoying improved interface can be realized. By way of example, when two windows are simultaneously generated for each of the search history display window 400 and the search query input window 600, as shown in FIG. 27, two different search processes can be executed for trial, whereby required document can effectively be searched by varying the search query in a trail-and-error manner. In this connection, the list display window 1800 can be opened from the respective search history window 400 for comparative review as shown in FIG. 28, whereby difference in the results which depend on the search queries as inputted can easily be determined.

When the database 180 with which the serve search system 170 is equipped stores graphic and image data in addition to text data, it is possible to acquire from the server search system the image data corresponding to the searched text by using a document identifier for accessing the image data in the text database. In other words, on the basis of the text data found to coincide with the search query from the search result, graphic or image data bearing correspondence to the above-mentioned text data can be displayed in an image display window 2900 by utilizing the document identifier, as illustrated in FIG. 29. In this way, there can easily be constructed a database system which allows not only the text data but also photographic data or graphic data to be searched on the basis of the associated text data.

As will now be appreciated from the foregoing description, there are provided according to the teachings of the invention, independent windows for the search query input display, the search result and history display, search result list display, the document display and so forth for allowing these displays to be shown in the respective windows while allowing the user to select freely these windows separately. Thus, a search terminal which enjoys improved manipulatability and which does not interfere with the flow of thinking of the user can be implemented. Furthermore, the search terminal according to the invention can transmit sequentially the current system states, i.e., the expansion result of the search term and search mode information.

Since the search query input window can present in the form of a menu a list of conditions which can be set as the search function, it is possible to inform the user of what sort of functions the search terminal can afford. After selection of the search function by the user, the window configuration can be changed so as to be optimal for inputting the selected function. By virtue of this feature, the search terminal provides an advantage that the user can receive guidance as to the methods of inputting the conditions which differ from one to another function even when the user is unfamiliar with these inputting methods.

Besides, because the data used in the list display window is acquired in precedence to the designation of the list display, idle time intervening the user operations can effectively used, whereby the search terminal exhibiting high-speed response and improved manipulatability can be realized.

The individual windows are saved for repeated display so long as the window abandon or close button is not activated by the user, while the control programs associated with the respective windows are placed in the state for awaiting the user request for the associated processing menu independent of one another. Thus, operation can be performed for the saved window at any time. By way of example, the search result list display can be performed at any time by designating the list display from the search history display window. Moreover, a plurality of documents can be reviewed comparatively with one another by using a corresponding number of document display windows. In this way, the present invention has provided a search terminal of highly improved manipulatabilily which can afford for the user to perform a variety of operations by using the saved windows without need for canceling the history of the search operations conducted by the user and without interrupting the flow of thinking of the user in proceeding with the search processing.

The present invention can be applied not only to the information search terminal in a client/server system in which work stations and the like are connected to a network but also to an independent information search system in which the search system 170 serving as a search engine and database 180 are organized into an integrated system.

We claim:

1. An information search terminal apparatus, comprising:
    means for storing results of search delivered from a search/retrieval system for searching and retrieving a document containing specified character strings;
    input means for inputting characters and a variety of designations; and
    display means for displaying a document containing a search term corresponding to said character string as a result of the search;
    said information search terminal apparatus, including
    a query input window for inputting a query statement for said search term;
    a search history display window for displaying said query statement and the number of documents as hit in the search;
    a search result list display window for displaying simultaneously titles of plural documents as hit in the search; and
    a document display window for displaying the document as a result of the search;
    wherein said windows are displayed on said display means.

2. An information search terminal apparatus according to claim 1, wherein a plurality of databases are connected to said search/retrieval system,
    said terminal apparatus includes a database selecting window for selecting a database to be subjected to the search from said plurality of databases, said database selecting window being displayed on said display means.

3. An information search terminal apparatus according to claim 2, wherein at least one of said database selecting window, said search query input window, said search history display window, and said document display window is provided with a display area for allowing the associated window to be closed.

4. An information search terminal apparatus according to claim 1, wherein said search history display window is provided with a display area for commanding interruption of the search.

5. An information search terminal apparatus according to claim 4, wherein when the search processing performed by said search system is interrupted in response to designation of said display area commanding the interruption of the search, the number of documents as hit until said interruption and a marker indicating said interruption are displayed in said search history display window.

6. An information search terminal apparatus according to claim 5, wherein data of bibliographic items and document data supplied from said search/retrieval system up to the time point of said interruption are stored in said storage means.

7. An information search terminal apparatus according to claim 1, wherein said search history display window is provided with a display area for designating change-over of search mode between a hierarchy search mode for screening a set of documents resulting from an immediately preceding search into a base set and a universe search mode for searching constantly a document set containing a predetermined number of documents as a base set in every search.

8. An information search terminal apparatus according to claim 7, wherein the mode change-over to said hierarchy search mode or said universe search mode is effected for each of the document sets resulting from the search and displayed on said search history display window.

9. An information search terminal apparatus according to claim 1, wherein said search query statement input window includes an input user interface suited for inputting at least one of simple condition, numeric condition, proximity condition, context condition, frequency condition and logical condition.

10. An information search terminal apparatus according to claim 1, wherein said search query input window is provided with a display area for activating an expanded term display window for displaying expanded terms to perform the search by generating and using expanded search terms having a similar meaning as the input search term.

11. An information search terminal apparatus according to claim 1, wherein said search query statement input window is provided with a display area for activating an expand option designating window for selecting expanded search terms for effecting the search by expanding search terms having a similar meaning as the input search term.

12. An information search terminal apparatus according to claim 1, wherein said search result list display window displays title of the document as hit together with at least one of data of creation of said document and author thereof.

13. An information search terminal apparatus according to claim 1, wherein in said document display window, a character string corresponding to the search term as hit is displayed under highlight in a document resulting from the search.

14. An information search terminal apparatus according to claim 1, wherein a character string in a document displayed in said document display window is designated by said input means so as to be reused by recalling the character string in said search query input window.

15. An information search terminal apparatus according to claim 1, wherein at least two of said search query input window, said search history display window, said search result list display window and said document display window are simultaneously displayed in a multi-window configuration.

16. An information search terminal apparatus, including:
   means for storing results of search delivered from a search/retrieval system for searching and retrieving a document containing specified character strings;
   input means for inputting characters and a variety of designations; and
   display means for displaying a document containing a search term corresponding to said character string and resulting from the search;
   wherein said information search terminal apparatus comprises a search history display window for displaying query statements used in the search and the number of documents as hit in the search, said search history display window being displayed on said display means.

17. An information search terminal apparatus, including:
   means for storing results of search delivered from a search/retrieval system for searching and retrieving a document containing specified character strings;
   input means for inputting characters and a variety of designations; and
   display means for displaying a document containing a search term corresponding to said character string and resulting from the search;
   wherein said information search terminal apparatus comprises an expanded term display window for displaying expanded terms for the search, said expanded terms being expanded from said input search term and having similar meaning as the latter, and an expand option designating window for selecting said expanded terms, wherein said windows are displayed on said display means.

18. An information search terminal apparatus, including:
   means for storing results of search delivered from a search/retrieval system for searching and retrieving a document containing specified character strings;
   input means for inputting characters and a variety of designations; and
   display means for displaying a document containing a search term corresponding to said character string and resulting from the search;
   wherein said information search terminal apparatus comprises search history display control means for controlling display of query statements used in the search and the number of documents as hit as a result of the search on said display means.

19. An information search terminal apparatus according to claim 18, further comprising query statement input control means for performing display control by activating an image for inputting the query statement for the search term, when a predetermined image area is designated on an image generated under the control of said search history display control means.

20. An information search terminal apparatus according to claim 19, further comprising expantion result display control means for performing display control by activating a display of expanded terms for the search expanded from said input search term and having similar meaning as the latter and a display for expand processing, when a predetermined image area is designated on an image generated under the control of said query statement input control means.

21. An information search terminal apparatus according to claim 18, further comprising search result list display control means for performing display control by activating an image for displaying simultaneously a plurality of document names of documents as hit in the search, when a predetermined image area is designated on an image generated under the control of said search history display control means.

22. An information search terminal apparatus according to claim 18, further comprising document display control means for performing display control by activating an image for displaying a document as a result of the search, when a predetermined image area is designated on an image generated under the control of said search history display control means or said search result list display control means.

23. An information search terminal apparatus according to claim 18, wherein when a predetermined area is designated on an image generated under the control of said search history display control means, search is performed by changing over a hierarchy search mode in which search is performed by screening a document set resulting from an immediately preceding search into a base document set and a universe search mode in which a document set containing a predetermined number of documents is searched constantly in every search as a base document set.

24. An information search system, comprising:
   search means for searching a document containing a specified search term;
   means for storing results of search delivered from said search means;
   input means for inputting characters and a variety of designations; and
   display means for display a document containing said character string and resulting from the search;
   wherein said display means displays a query input window for inputting a query statement for said search character string, a search history display window for displaying said query statement and the number of documents as hit in the search, a search result list display window for displaying simultaneously titles of plural documents as hit in the search and a document display window for displaying the document as a result of the search.

25. An information search system, including:
   search means for searching a document containing a specified character string;
   means for storing results of search delivered from said search means;
   input means for inputting characters and a variety of designations; and
   display means for displaying a document containing said search character string as a result of the search;
   said information search system further comprising:
   query statement input control means for displaying and controlling an image for inputting a query statement for said search term;
   search history display control means for displaying and controlling an image for displaying said query statement and the number of documents as hit in the search;

search result list display control means for displaying and controlling an image for displaying simultaneously titles of plural documents as hit; and document display control means for displaying and controlling an image for displaying the document as a result of the search; and expanded result display control means for displaying and controlling an image for displaying expanded search terms developed from said input search term and having similar meaning as the latter and performing development selecting processing.

* * * * *